(12) United States Patent
Zhang

(10) Patent No.: US 10,412,093 B2
(45) Date of Patent: Sep. 10, 2019

(54) PREVENTING UNAUTHORIZED ACCESS TO SECURED INFORMATION SYSTEMS BY INJECTING DEVICE DATA COLLECTORS

(71) Applicant: Bank of America Corporation, Charlotte, NC (US)

(72) Inventor: Xianhong Zhang, Issaquah, WA (US)

(73) Assignee: Bank of America Corporation, Charlotte, NC (US)

( * ) Notice: Subject to any disclaimer, the term of this patent is extended or adjusted under 35 U.S.C. 154(b) by 461 days.

(21) Appl. No.: 15/252,505

(22) Filed: Aug. 31, 2016

(65) Prior Publication Data

US 2018/0063132 A1 Mar. 1, 2018

(51) Int. Cl.
*H04L 29/06* (2006.01)
*G06F 21/14* (2013.01)
*G06F 21/62* (2013.01)

(52) U.S. Cl.
CPC ............ *H04L 63/102* (2013.01); *G06F 21/14* (2013.01); *G06F 21/6263* (2013.01); *H04L 63/08* (2013.01)

(58) Field of Classification Search
CPC .................................................. H04L 63/102
See application file for complete search history.

(56) References Cited

U.S. PATENT DOCUMENTS

| | | | | |
|---|---|---|---|---|
| 9,491,183 | B1 * | 11/2016 | Dippenaar | ............ H04L 63/107 |
| 2003/0105862 | A1 * | 6/2003 | Villavicencio | .......... H04L 63/08 709/225 |
| 2005/0022006 | A1 * | 1/2005 | Bass | ................... H04L 63/0815 726/4 |
| 2016/0246904 | A1 | 8/2016 | Meagher et al. | |
| 2016/0247034 | A1 | 8/2016 | Lee et al. | |
| 2016/0247089 | A1 | 8/2016 | Zhao et al. | |
| 2016/0247094 | A1 | 8/2016 | Scicluna et al. | |
| 2016/0247095 | A1 | 8/2016 | Scicluna et al. | |
| 2016/0247096 | A1 | 8/2016 | Scicluna et al. | |
| 2016/0247106 | A1 | 8/2016 | Dalloro et al. | |
| 2016/0247109 | A1 | 8/2016 | Scicluna et al. | |
| 2016/0247129 | A1 | 8/2016 | Song et al. | |
| 2016/0247144 | A1 | 8/2016 | Oh et al. | |
| 2016/0247164 | A1 | 8/2016 | Salajegheh et al. | |

(Continued)

*Primary Examiner* — William S Powers
(74) *Attorney, Agent, or Firm* — Banner & Witcoff, Ltd.; Michael A. Springs

(57) ABSTRACT

Aspects of the disclosure relate to providing information security and preventing unauthorized access to resources of an information system by injecting device data collectors into pages and/or other interfaces provided by and/or otherwise associated with an information system. A computing platform may intercept a request for a uniform resource locator from a client computing device based on configuration information identifying the uniform resource locator as being protected. The computing platform may request and receive, from an application server, a page associated with the uniform resource locator. Then, the computing platform may generate a modified version of the page associated with the uniform resource locator by injecting collector code into source code defining the page associated with the uniform resource locator. Subsequently, the computing platform may send, to the client computing device, the modified version of the page associated with the uniform resource locator.

20 Claims, 27 Drawing Sheets

(56) References Cited

U.S. PATENT DOCUMENTS

| | | |
|---|---|---|
| 2016/0247191 A1 | 8/2016 | Bhalla et al. |
| 2016/0247238 A1 | 8/2016 | Kunapuli et al. |
| 2016/0247245 A1 | 8/2016 | Baic |
| 2016/0247247 A1 | 8/2016 | Scicluna |
| 2016/0247377 A1 | 8/2016 | Ricci |
| 2016/0248250 A1 | 8/2016 | Meagher et al. |
| 2016/0248255 A1 | 8/2016 | Rive et al. |
| 2016/0248600 A1 | 8/2016 | Bernstein et al. |
| 2016/0248626 A1 | 8/2016 | Vemia et al. |
| 2016/0248631 A1 | 8/2016 | Duchesneau |
| 2016/0248639 A1 | 8/2016 | Burke et al. |
| 2016/0248642 A1 | 8/2016 | Rajasekar |
| 2016/0248655 A1 | 8/2016 | Francisco et al. |
| 2016/0248676 A1 | 8/2016 | Thanasekaran |
| 2016/0248699 A1 | 8/2016 | Kundu et al. |
| 2016/0248703 A1 | 8/2016 | Gopalakrishnan et al. |
| 2016/0248722 A1 | 8/2016 | Miki et al. |
| 2016/0248748 A1 | 8/2016 | Caterino et al. |
| 2016/0248752 A1 | 8/2016 | Blinn |
| 2016/0248761 A1 | 8/2016 | Talvensaari et al. |
| 2016/0248765 A1 | 8/2016 | Saxena et al. |
| 2016/0248766 A1 | 8/2016 | Tembey et al. |
| 2016/0248770 A1 | 8/2016 | Novack et al. |
| 2016/0248778 A1 | 8/2016 | Erdal |
| 2016/0248785 A1 | 8/2016 | Petry et al. |
| 2016/0248791 A1 | 8/2016 | Tidwell et al. |
| 2016/0248792 A1 | 8/2016 | Tidwell et al. |
| 2016/0248798 A1 | 8/2016 | Cabrera et al. |
| 2016/0248803 A1 | 8/2016 | O'Connell et al. |
| 2016/0248813 A1 | 8/2016 | Byrnes |
| 2016/0248850 A1 | 8/2016 | Agrawal et al. |
| 2016/0248861 A1 | 8/2016 | Lawson et al. |
| 2016/0248868 A1 | 8/2016 | Fichtenholtz et al. |
| 2016/0248875 A1 | 8/2016 | Frerking et al. |
| 2016/0248906 A1 | 8/2016 | Schrader et al. |
| 2016/0248914 A1 | 8/2016 | Lacey |
| 2016/0249170 A1 | 8/2016 | Freeland et al. |
| 2016/0249193 A1 | 8/2016 | Edge et al. |
| 2016/0249358 A1 | 8/2016 | Li et al. |
| 2017/0118223 A1* | 4/2017 | Mathew ................ H04L 63/105 |

\* cited by examiner

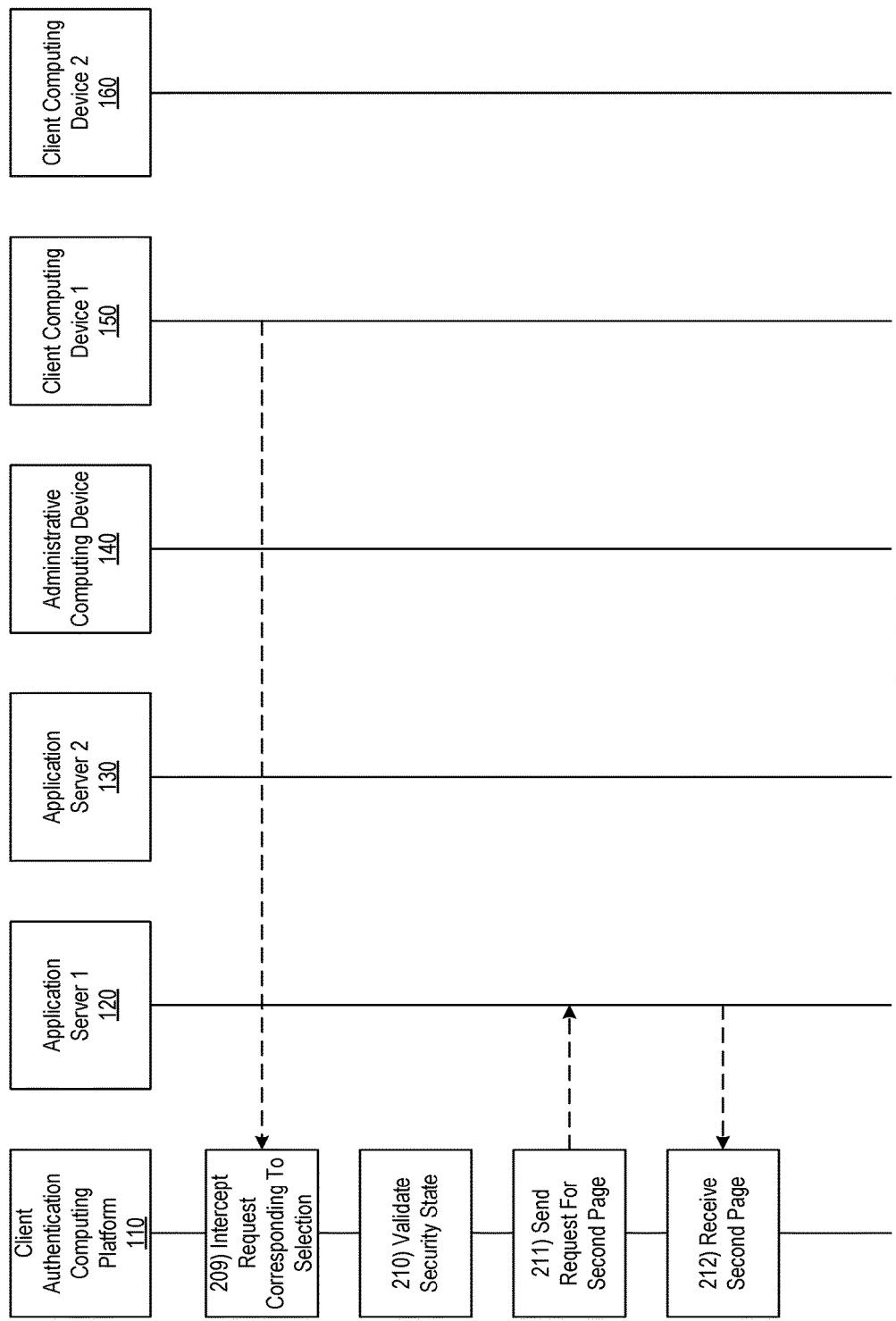

PREVENTING UNAUTHORIZED ACCESS TO SECURED INFORMATION SYSTEMS BY INJECTING DEVICE DATA COLLECTORS

BACKGROUND

Aspects of the disclosure relate to providing information security and preventing unauthorized access to resources of an information system. In particular, one or more aspects of the disclosure relate to preventing unauthorized access to secured information systems by injecting device data collectors into pages and/or other interfaces provided by and/or otherwise associated with such information systems.

As organizations increasingly provide electronic portals via which various users may access, view, and/or modify information, including client information, ensuring the safety and security of information maintained by such organizations and/or made available via such portals is increasingly important. In many instances, however, it may be difficult to ensure the safety and security of such information while also optimizing the efficient and effective technical operations of the computer systems that maintain such information and/or provide such portals.

SUMMARY

Aspects of the disclosure provide effective, efficient, scalable, and convenient technical solutions that address and overcome the technical problems associated with providing information security and preventing unauthorized access to resources of an information system by injecting device data collectors into pages and/or other interfaces provided by and/or otherwise associated with an information system. In particular, one or more aspects of the disclosure provide techniques for implementing and/or controlling device data collectors, which may be used by information security computer systems and/or other security infrastructure to collect and evaluate device state information and/or other information associated with client devices.

In accordance with one or more embodiments, a computing platform having at least one processor, a memory, and a communication interface may intercept a request for a first uniform resource locator from a first client computing device based on configuration information identifying the first uniform resource locator as being protected. Based on intercepting the request for the first uniform resource locator, the computing platform may send, via the communication interface, to a first application server, a request for a first page associated with the first uniform resource locator. Subsequently, the computing platform may receive, via the communication interface, from the first application server, the first page associated with the first uniform resource locator. Then, the computing platform may generate a modified version of the first page associated with the first uniform resource locator by injecting first collector code into source code defining the first page associated with the first uniform resource locator. Subsequently, the computing platform may send, via the communication interface, to the first client computing device, the modified version of the first page associated with the first uniform resource locator.

In some embodiments, prior to intercepting the request for the first uniform resource locator, the computing platform may receive, via the communication interface, from an administrative computing device, the configuration information identifying the first uniform resource locator as being protected. In addition, the computing platform may store, in a client authentication database, the configuration information identifying the first uniform resource locator as being protected.

In some embodiments, the computing platform may receive, via the communication interface, from the first client computing device, device data collected by a first device data collector associated with the first collector code injected into the source code defining the first page associated with the first uniform resource locator.

In some embodiments, the computing platform may determine a security state of the first client computing device based on the device data collected by the first device data collector. In some instances, determining the security state of the first client computing device based on the device data collected by the first device data collector may include analyzing the device data collected by the first device data collector. In other instances, determining the security state of the first client computing device based on the device data collected by the first device data collector may include: sending the device data collected by the first device data collector to a first collector support server associated with the first device data collector; and receiving, from the first collector support server associated with the first device data collector, collector results data identifying the security state of the first client computing device.

In some embodiments, the computing platform may intercept a request corresponding to a selection of an interface element included in the modified version of the first page associated with the first uniform resource locator. Based on intercepting the request corresponding to the selection of the interface element included in the modified version of the first page associated with the first uniform resource locator, the computing platform may validate a security state of the first client computing device based on the device data collected by the first device data collector. Based on validating the security state of the first client computing device, the computing platform may send, via the communication interface, to the first application server, a request for a second page associated with the selection of the interface element. Subsequently, the computing platform may receive, via the communication interface, from the first application server, the second page associated with the selection of the interface element. Then, the computing platform may generate a modified version of the second page associated with the selection of the interface element by injecting second collector code into source code defining the second page associated with the selection of the interface element. Subsequently, the computing platform may send, via the communication interface, to the first client computing device, the modified version of the second page associated with the selection of the interface element.

In some embodiments, the computing platform may receive, via the communication interface, from the first client computing device, device data collected by a second device data collector associated with the second collector code injected into the source code defining the second page associated with the selection of the interface element. In some instances, the second device data collector associated with the second collector code injected into the source code defining the second page associated with the selection of the interface element may be different from the first device data collector associated with the first collector code injected into the source code defining the first page associated with the first uniform resource locator.

In some embodiments, the computing platform may intercept a request for a second uniform resource locator from a second client computing device based on configuration information identifying the second uniform resource locator as being protected. Based on intercepting the request for the second uniform resource locator, the computing platform may send, via the communication interface, to a second application server, a request for a third page associated with the second uniform resource locator. Subsequently, the computing platform may receive, via the communication interface, from the second application server, the third page associated with the second uniform resource locator. Then, the computing platform may generate a modified version of the third page associated with the second uniform resource locator by injecting third collector code into source code defining the third page associated with the second uniform resource locator. Subsequently, the computing platform may send, via the communication interface, to the second client computing device, the modified version of the third page associated with the second uniform resource locator.

In some embodiments, prior to intercepting the request for the second uniform resource locator, the computing platform may receive, via the communication interface, from an administrative computing device, the configuration information identifying the second uniform resource locator as being protected. In addition, the computing platform may store, in a client authentication database, the configuration information identifying the second uniform resource locator as being protected.

In some embodiments, the computing platform may receive, via the communication interface, from the second client computing device, device data collected by a third device data collector associated with the third collector code injected into the source code defining the third page associated with the second uniform resource locator.

In some embodiments, the computing platform may determine a security state of the second client computing device based on the device data collected by the third device data collector. In some instances, determining the security state of the second client computing device based on the device data collected by the third device data collector may include analyzing the device data collected by the third device data collector. In other instances, determining the security state of the second client computing device based on the device data collected by the third device data collector may include: sending the device data collected by the third device data collector to a second collector support server associated with the third device data collector; and receiving, from the second collector support server associated with the third device data collector, collector results data identifying the security state of the second client computing device.

In some embodiments, the computing platform may intercept a request corresponding to a selection of an interface element included in the modified version of the third page associated with the second uniform resource locator. Based on intercepting the request corresponding to the selection of the interface element included in the modified version of the third page associated with the second uniform resource locator, the computing platform may validate a security state of the second client computing device based on the device data collected by the third device data collector. Based on validating the security state of the second client computing device, the computing platform may send, via the communication interface, to the second application server, a request for a fourth page associated with the selection of the interface element. Subsequently, the computing platform may receive, via the communication interface, from the second application server, the fourth page associated with the selection of the interface element. Then, the computing platform may generate a modified version of the fourth page associated with the selection of the interface element by injecting fourth collector code into source code defining the fourth page associated with the selection of the interface element. Subsequently, the computing platform may send, via the communication interface, to the second client computing device, the modified version of the fourth page associated with the selection of the interface element.

In some embodiments, the computing platform may receive, via the communication interface, from the second client computing device, device data collected by a fourth device data collector associated with the fourth collector code injected into the source code defining the fourth page associated with the selection of the interface element. In some instances, the fourth device data collector associated with the fourth collector code injected into the source code defining the fourth page associated with the selection of the interface element may be different from the third device data collector associated with the third collector code injected into the source code defining the third page associated with the second uniform resource locator.

In accordance with one or more additional embodiments, a computing platform having at least one processor, a memory, and a communication interface may intercept a request corresponding to a selection of an interface element included in a modified version of a first page associated with a first uniform resource locator. Based on intercepting the request corresponding to the selection of the interface element included in the modified version of the first page associated with the first uniform resource locator, the computing platform may validate a security state of a first client computing device based on device data collected by a first device data collector. In response to failing to validate the security state of the first client computing device based on the device data collected by the first device data collector, the computing platform may generate a first step-up authentication prompt for the first client computing device. Subsequently, the computing platform may send, via the communication interface, to the first client computing device, the first step-up authentication prompt generated for the first client computing device. In addition, the first step-up authentication prompt generated for the first client computing device may be configured to prompt a user of the first client computing device to provide authentication input to access a second page associated with the selection of the interface element.

In some embodiments, the computing platform may receive, via the communication interface, from the first client computing device, a response to the first step-up authentication prompt generated for the first client computing device. Subsequently, the computing platform may validate the response to the first step-up authentication prompt received from the first client computing device. Based on validating the response to the first step-up authentication prompt, send, via the communication interface, to a first application server, a request for the second page associated with the selection of the interface element. Subsequently, the computing platform may receive, via the communication interface, from the first application server, the second page associated with the selection of the interface element. Then, the computing platform may generate a modified version of the second page associated with the selection of the interface element by injecting second collector code into source code defining the second page associated with the selection of the interface element. Subsequently, the computing platform may send, via the communication interface, to the first client computing device, the modified version of the second page associated with the selection of the interface element.

In some embodiments, the first step-up authentication prompt generated for the first client computing device may include a one-time passcode authentication prompt. In some embodiments, the first step-up authentication prompt generated for the first client computing device may include a biometric authentication prompt. In some embodiments, the first step-up authentication prompt generated for the first client computing device may include a security question authentication prompt.

In some embodiments, validating the security state of the first client computing device based on the device data collected by the first device data collector may include determining the security state of the first client computing device based on the device data collected by the first device data collector. In some instances, determining the security state of the first client computing device based on the device data collected by the first device data collector may include analyzing the device data collected by the first device data collector. In some instances, determining the security state of the first client computing device based on the device data collected by the first device data collector may include: sending the device data collected by the first device data collector to a first collector support server associated with the first device data collector; and receiving, from the first collector support server associated with the first device data collector, collector results data identifying the security state of the first client computing device.

In some embodiments, prior to intercepting the request corresponding to the selection of the interface element included in the modified version of the first page associated with the first uniform resource locator, the computing platform may intercept a request for the first uniform resource locator from the first client computing device based on configuration information identifying the first uniform resource locator as being protected. Based on intercepting the request for the first uniform resource locator, the computing platform may send, via the communication interface, to the first application server, a request for the first page associated with the first uniform resource locator. Subsequently, the computing platform may receive, via the communication interface, from the first application server, the first page associated with the first uniform resource locator. Then, the computing platform may generate the modified version of the first page associated with the first uniform resource locator by injecting first collector code into source code defining the first page associated with the first uniform resource locator. Subsequently, the computing platform may send, via the communication interface, to the first client computing device, the modified version of the first page associated with the first uniform resource locator.

In some embodiments, prior to intercepting the request for the first uniform resource locator, the computing platform may receive, via the communication interface, from an administrative computing device, the configuration information identifying the first uniform resource locator as being protected. In addition, the computing platform may store, in a client authentication database, the configuration information identifying the first uniform resource locator as being protected.

In some embodiments, the computing platform may intercept a request corresponding to a selection of an interface element included in a modified version of a third page associated with a second uniform resource locator. Based on intercepting the request corresponding to the selection of the interface element included in the modified version of the third page associated with the second uniform resource locator, the computing platform may validate a security state of a second client computing device based on device data collected by a third device data collector. In response to failing to validate the security state of the second client computing device based on the device data collected by the third device data collector, the computing platform may generate a second step-up authentication prompt for the second client computing device. Subsequently, the computing platform may send, via the communication interface, to the second client computing device, the second step-up authentication prompt generated for the second client computing device. In addition, the computing platform may the second step-up authentication prompt generated for the second client computing device may be configured to prompt a user of the second client computing device to provide authentication input to access a fourth page associated with the selection of the interface element.

In some embodiments, the computing platform may receive, via the communication interface, from the second client computing device, a response to the second step-up authentication prompt generated for the second client computing device. Subsequently, the computing platform may validate the response to the second step-up authentication prompt received from the second client computing device. Based on validating the response to the second step-up authentication prompt, the computing platform may send, via the communication interface, to a second application server, a request for the fourth page associated with the selection of the interface element. Subsequently, the computing platform may receive, via the communication interface, from the second application server, the fourth page associated with the selection of the interface element. Then, the computing platform may generate a modified version of the fourth page associated with the selection of the interface element by injecting fourth collector code into source code defining the fourth page associated with the selection of the interface element. Subsequently, the computing platform may send, via the communication interface, to the second client computing device, the modified version of the fourth page associated with the selection of the interface element.

In some embodiments, the second step-up authentication prompt generated for the second client computing device may include a one-time passcode authentication prompt. In some embodiments, the second step-up authentication prompt generated for the second client computing device may include a biometric authentication prompt. In some embodiments, the second step-up authentication prompt generated for the second client computing device may include a security question authentication prompt.

In some embodiments, validating the security state of the second client computing device based on the device data collected by the third device data collector may include determining the security state of the second client computing device based on the device data collected by the third device data collector. In some instances, determining the security state of the second client computing device based on the device data collected by the third device data collector may include analyzing the device data collected by the third device data collector. In some instances, determining the security state of the second client computing device based on the device data collected by the third device data collector may include: sending the device data collected by the third device data collector to a second collector support server associated with the third device data collector; and receiving, from the second collector support server associated with the third device data collector, collector results data identifying the security state of the second client computing device.

In some embodiments, prior to intercepting the request corresponding to the selection of the interface element included in the modified version of the third page associated with the second uniform resource locator, the computing platform may intercept a request for the second uniform resource locator from the second client computing device based on configuration information identifying the second uniform resource locator as being protected. Based on intercepting the request for the second uniform resource locator, the computing platform may send, via the communication interface, to the second application server, a request for the third page associated with the second uniform resource locator. Subsequently, the computing platform may receive, via the communication interface, from the second application server, the third page associated with the second uniform resource locator. Then, the computing platform may generate the modified version of the third page associated with the second uniform resource locator by injecting third collector code into source code defining the third page associated with the second uniform resource locator. Subsequently, the computing platform may send, via the communication interface, to the second client computing device, the modified version of the third page associated with the second uniform resource locator.

In some embodiments, prior to intercepting the request for the second uniform resource locator, the computing platform may receive, via the communication interface, from an administrative computing device, the configuration information identifying the second uniform resource locator as being protected. In addition, the computing platform may store, in a client authentication database, the configuration information identifying the second uniform resource locator as being protected.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for preventing unauthorized access to secured information systems by injecting device data collectors in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
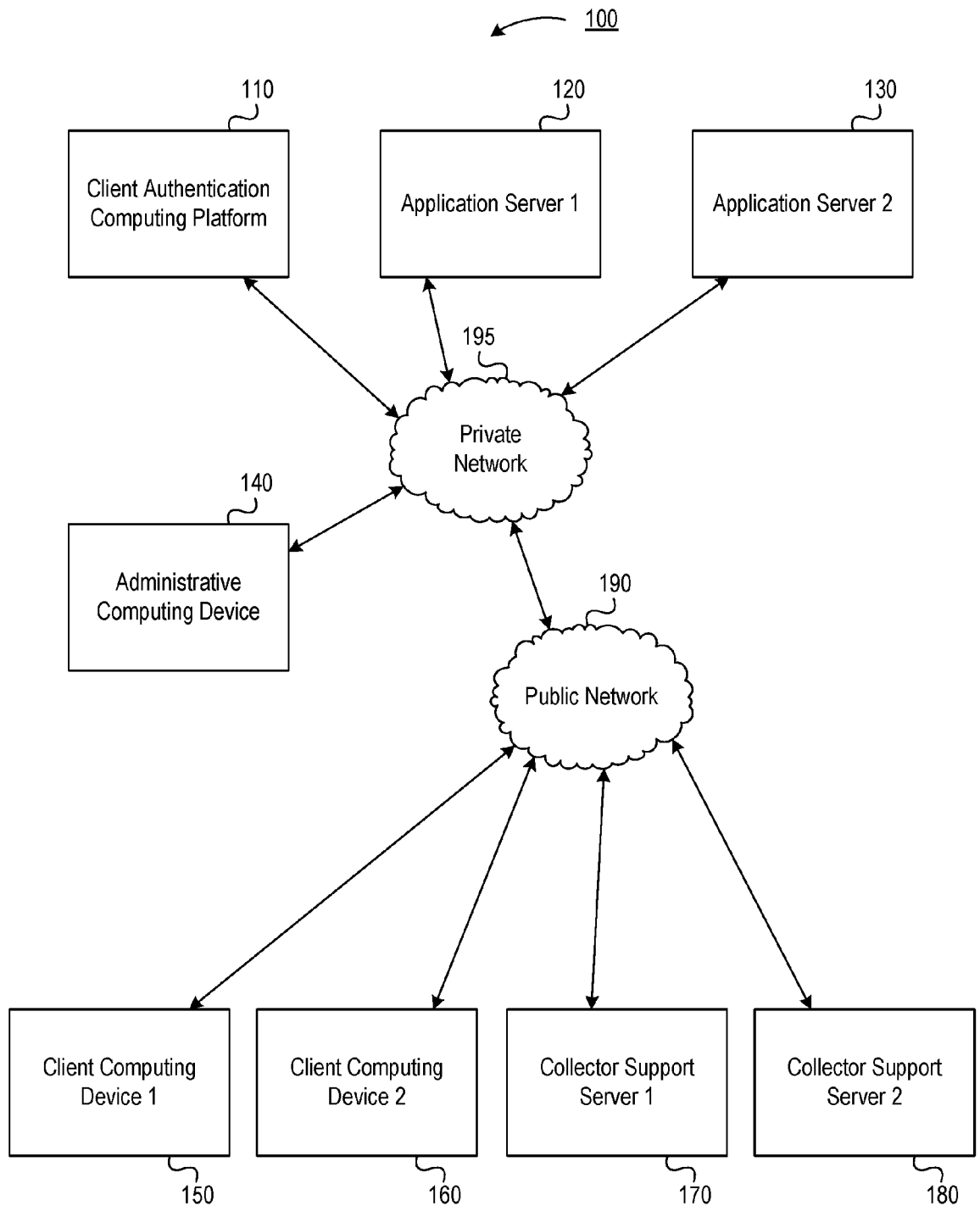
FIGS. 1A and 1B depict an illustrative computing environment for preventing unauthorized access to secured information systems by injecting device data collectors in accordance with one or more example embodiments.
Figure 1B:
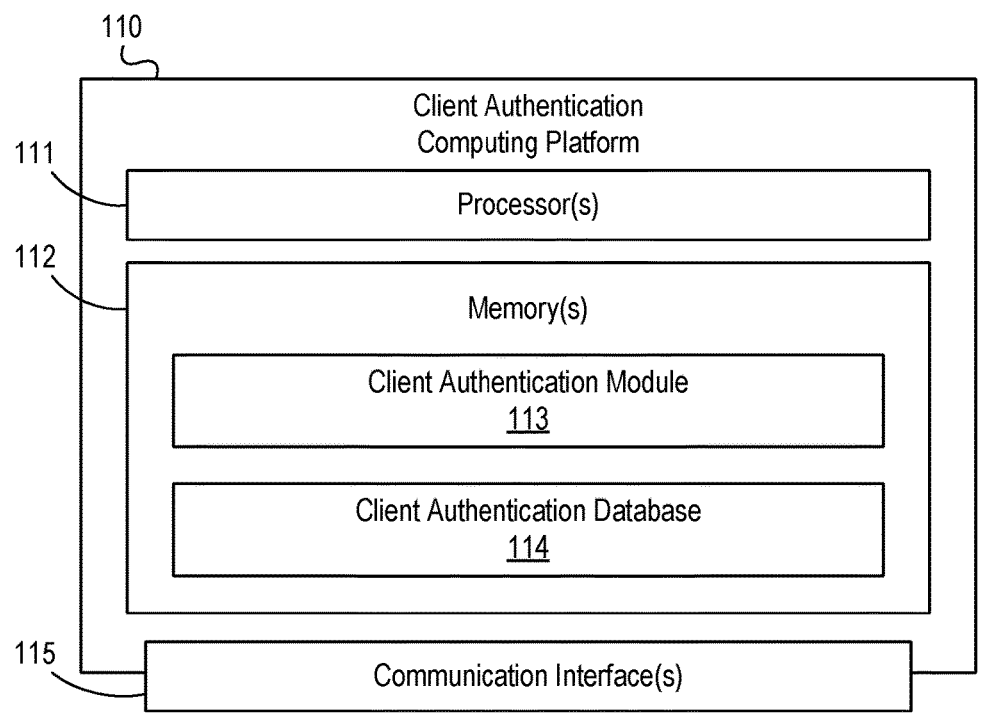

FIGS. 1A and 1B depict an illustrative computing environment for preventing unauthorized access to secured information systems by injecting device data collectors in accordance with one or more example embodiments. Referring to FIG. 1A, computing environment 100 may include one or more computing devices and/or other computer systems. For example, computing environment 100 may include a client authentication computing platform 110, a first application server 120, a second application server 130, an administrative computing device 140, a first client computing device 150, a second client computing device 160, a first collector support server 170, and a second collector support server 180.

Client authentication computing platform 110 may be configured to authenticate one or more client devices to a client portal, serve one or more pages of the client portal to the one or more client devices, and/or perform other functions, as discussed in greater detail below. In some instances, client authentication computing platform 110 may be configured to serve, transmit, and/or otherwise provide one or more portal interfaces to one or more client devices. For example, client authentication computing platform 110 may be configured to provide one or more pages of a customer portal, such as an online banking portal, to one or more customers of an organization, such as a financial institution, who may use one or more client computing devices to access the portal, such as client computing device 150 and client computing device 160. In some instances, in addition to being configured to provide an online banking portal associated with a financial institution to one or more customers of the financial institution and/or their associated computing devices, client authentication computing platform 110 also may be configured to provide a mobile banking portal associated with the financial institution to various customers of the financial institution and/or their associated mobile computing devices. Such portals may, for instance, provide customers of the financial institution with access to financial account information (e.g., account balance information, account statements, recent transaction history information, or the like) and/or may provide customers of the financial institution with menus, controls, and/or other options to schedule and/or execute various transactions (e.g., online bill pay transactions, person-to-person funds transfer transactions, or the like).

Application server 120 may be configured to store and/or execute one or more web applications and/or other applications that cause application server 120 to generate one or more pages of a client portal, which may, for instance, be served to one or more client devices (e.g., client computing device 150, client computing device 160) by client authentication computing platform 110 and/or one or more other systems associated with an organization operating client authentication computing platform 110, such as a client portal server that is controlled and/or directed by client authentication computing platform 110. Application server 130 also may be configured to store and/or execute one or more web applications and/or other applications that cause application server 130 to generate one or more pages of a client portal, which may, for instance, be served to one or more client devices (e.g., client computing device 150, client computing device 160) by client authentication computing platform 110 and/or one or more other systems associated with an organization operating client authentication computing platform 110, such as a client portal server that is controlled and/or directed by client authentication computing platform 110. In some instances, application server 130 may, for example, store and/or execute one or more web applications and/or other applications different from the one or more web applications and/or other applications that are stored and/or executed by application server 120. In addition, application server 130 may, for example, generate one or more pages of a client portal different from the one or more pages of the client portal that may be generated by application server 120. For example, application server 120 may generate one or more pages of a client portal that enable a user of the client portal to view and/or modify user account information and/or user profile information, such as the user's username, mailing address, email address, telephone number, and/or other user profile information, and application server 130 may generate one or more pages of the client portal that enable a user of the client portal to view transaction history information, request one or more new transactions, and/or perform other transaction-related functions.

Administrative computing device 140 may be configured to provide one or more interfaces that allow for configuration and management of one or more other computing devices and/or computer systems included in computing environment 100. For example, administrative computing device 140 may be configured to provide one or more interfaces to a user of administrative computing device 140 to configure and/or manage client authentication computing platform 110, application server 120, and/or application server 130.

Client computing device 150 may be configured to be used by a first customer of an organization, such as a customer of a financial institution. In some instances, client computing device 150 may, for example, be registered with the organization and/or one or more computer systems in computing environment 100, such that the organization and/or the one or more computer systems maintain one or more records linking client computing device 150 to the first customer of the organization. Client computing device 160 may be configured to be used by a second customer of the organization (who may, e.g., be different from the first customer of the organization). In some instances, client computing device 160 may, for example, be registered with the organization and/or one or more computer systems in computing environment 100, such that the organization and/or the one or more computer systems maintain one or more records linking client computing device 160 to the second customer of the organization.

Collector support server 170 may be configured to process data collected by a first device data collector and/or otherwise support operations of a first device data collector. In some instances, collector support server 170 may be controlled and/or operated by a first entity different from an organization operating client authentication computing platform 110, such as a vendor or other third-party entity providing data analysis services to the organization operating client authentication computing platform 110. Collector support server 180 may be configured to process data collected by a second device data collector and/or otherwise support operations of a second device data collector different from the first device data collector. In some instances, collector support server 180 may be controlled and/or operated by a second entity different from an organization operating client authentication computing platform 110, such as a vendor or other third-party entity providing data analysis services to the organization operating client authentication computing platform 110 different from the first entity.

In one or more arrangements, application server 120, application server 130, administrative computing device 140, client computing device 150, client computing device 160, collector support server 170, and collector support server 180 may be any type of computing device capable of receiving a user interface, receiving input via the user interface, and communicating the received input to one or more other computing devices. For example, application server 120, application server 130, administrative computing device 140, client computing device 150, client computing device 160, collector support server 170, and collector support server 180 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of application server 120, application server 130, administrative computing device 140, client computing device 150, client computing device 160, collector support server 170, and collector support server 180 may, in some instances, be special-purpose computing devices configured to perform specific functions.

Computing environment 100 also may include one or more computing platforms. For example, computing environment 100 may include client authentication computing platform 110. As illustrated in greater detail below, client authentication computing platform 110 may include one or more computing devices configured to perform one or more of the functions described herein. For example, client authentication computing platform 110 may include one or more computers (e.g., laptop computers, desktop computers, servers, server blades, or the like).

Computing environment 100 also may include one or more networks, which may interconnect one or more of client authentication computing platform 110, application server 120, application server 130, administrative computing device 140, client computing device 150, client computing device 160, collector support server 170, and collector support server 180. For example, computing environment 100 may include public network 190 and private network 195. Private network 195 and/or public network 190 may include one or more sub-networks (e.g., local area networks (LANs), wide area networks (WANs), or the like). Private network 195 may be associated with a particular organization (e.g., a corporation, financial institution, educational institution, governmental institution, or the like) and may interconnect one or more computing devices associated with the organization. For example, client authentication computing platform 110, application server 120, application server 130, and administrative computing device 140 may be associated with an organization (e.g., a financial institution), and private network 195 may be associated with and/or operated by the organization, and may include one or more networks (e.g., LANs, WANs, virtual private networks (VPNs), or the like) that interconnect client authentication computing platform 110, application server 120, application server 130, and administrative computing device 140 and one or more other computing devices and/or computer systems that are used by, operated by, and/or otherwise associated with the organization. Public network 190 may connect private network 195 and/or one or more computing devices connected thereto (e.g., client authentication computing platform 110, application server 120, application server 130, and administrative computing device 140) with one or more networks and/or computing devices that are not associated with the organization. For example, client computing device 150, client computing device 160, collector support server 170, and collector support server 180 might not be associated with an organization that operates private network 195 (e.g., because client computing device 150, client computing device 160, collector support server 170, and collector support server 180 may be owned, operated, and/or serviced by one or more entities different from the organization that operates private network 195, such as one or more customers of the organization and/or vendors of the organization, rather than being owned and/or operated by the organization itself or an employee or affiliate of the organization), and public network 190 may include one or more networks (e.g., the internet) that connect client computing device 150, client computing device 160, collector support server 170, and collector support server 180 to private network 195 and/or one or more computing devices connected thereto (e.g., client authentication computing platform 110, application server 120, application server 130, and administrative computing device 140).

Referring to FIG. 1B, client authentication computing platform 110 may include one or more processors 111, memory 112, and communication interface 115. A data bus may interconnect processor(s) 111, memory 112, and communication interface 115. Communication interface 115 may be a network interface configured to support communication between client authentication computing platform 110 and one or more networks (e.g., private network 195, public network 190, or the like). Memory 112 may include one or more program modules having instructions that when executed by processor(s) 111 cause client authentication computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of client authentication computing platform 110 and/or by different computing devices that may form and/or otherwise make up client authentication computing platform 110. For example, memory 112 may have, store, and/or include a client authentication module 113 and a client authentication database 114. Client authentication module 113 may have instructions that direct and/or cause client authentication computing platform 110 to authenticate one or more client devices to a client portal, serve one or more pages of the client portal to the one or more client devices, and/or perform other functions, as discussed in greater detail below. Client authentication database 114 may store information used by client authentication module 113 and/or client authentication computing platform 110 in authenticating one or more client devices to a client portal, serving one or more pages of the client portal to the one or more client devices, and/or in performing other functions.

Figure 2A:
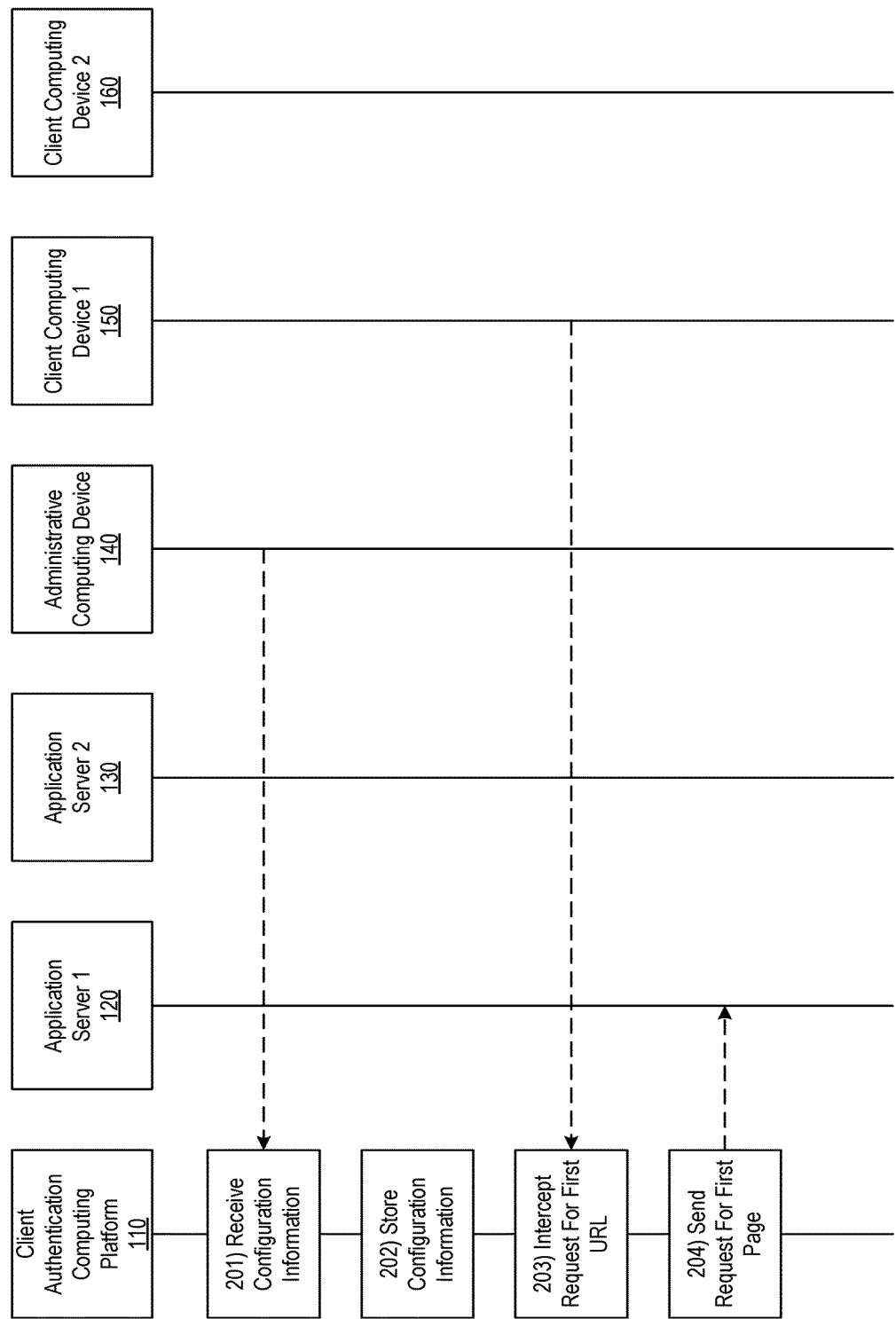

FIGS. 2A-2H depict an illustrative event sequence for preventing unauthorized access to secured information systems by injecting device data collectors in accordance with one or more example embodiments. Referring to FIG. 2A, at step 201, client authentication computing platform 110 may receive configuration information from administrative computing device 140. For example, at step 201, client authentication computing platform 110 may receive, via a communication interface (e.g., communication interface 115), from an administrative computing device (e.g., administrative computing device 140), configuration information identifying a first uniform resource locator as being protected. For instance, client authentication computing platform 110 may receive configuration information from administrative computing device 140 that identifies and/or otherwise defines one or more protected uniform resource locators to which device fingerprinting techniques, device data collection and/or analysis techniques, and/or other secure authentication techniques are to be applied (e.g., by client authentication computing platform 110 and/or one or more other computer systems associated with an organization operating client authentication computing platform 110, such as application server 120 and application server 130). At step 202, client authentication computing platform 110 may store the configuration information received from administrative computing device 140. For example, at step 202, client authentication computing platform 110 may store, in a client authentication database (e.g., client authentication database 114), the configuration information identifying the first uniform resource locator as being protected.

At step 203, client authentication computing platform 110 may intercept a request for a first uniform resource locator. For example, at step 203, client authentication computing platform 110 may intercept a request for a first uniform resource locator from a first client computing device (e.g., client computing device 150) based on configuration information identifying the first uniform resource locator as being protected. For instance, in intercepting such a request, client authentication computing platform 110 may receive a request for the first uniform resource locator from client computing device 150 and may identify and/or otherwise determine that the first uniform resource locator is protected based on configuration information identifying the first uniform resource locator as being protected (which may, e.g., be received by client authentication computing platform 110 from administrative computing device 140 and/or be stored by client authentication computing platform 110 in client authentication database 114). In addition, the identification and/or determination of the first uniform resource locator as being protected may trigger and/or otherwise cause client authentication computing platform 110 to implement and/or otherwise apply one or more device fingerprinting techniques, device data collection and/or analysis techniques, and/or other secure authentication techniques to one or more pages associated with the first uniform resource locator in which, for instance, client authentication computing platform 110 may inject one or more device data collectors into the one or more pages associated with the first uniform resource locator, as illustrated in greater detail below.

At step 204, client authentication computing platform 110 may send a request for a first page to application server 120. For example, at step 204, based on intercepting the request for the first uniform resource locator (e.g., at step 203), client authentication computing platform 110 may send, via the communication interface (e.g., communication interface 115), to a first application server (e.g., application server 120), a request for a first page associated with the first uniform resource locator. For instance, the first uniform resource locator may correspond to the first page, and client authentication computing platform 110 may request the first page from application server 120 because the first page may be generated by application server 120 and/or an application executed on application server 120 (and subsequently served by client authentication computing platform 110 to client computing device 150). The first page may, for example, include user-specific content that is dynamically inserted and/or generated by application server 120 and/or by an application executed on application server 120 for a particular user account, which may be identified by client authentication computing platform 110 in information included in the request for the first page sent by client authentication computing platform 110 to application server 120.

Figure 2B:
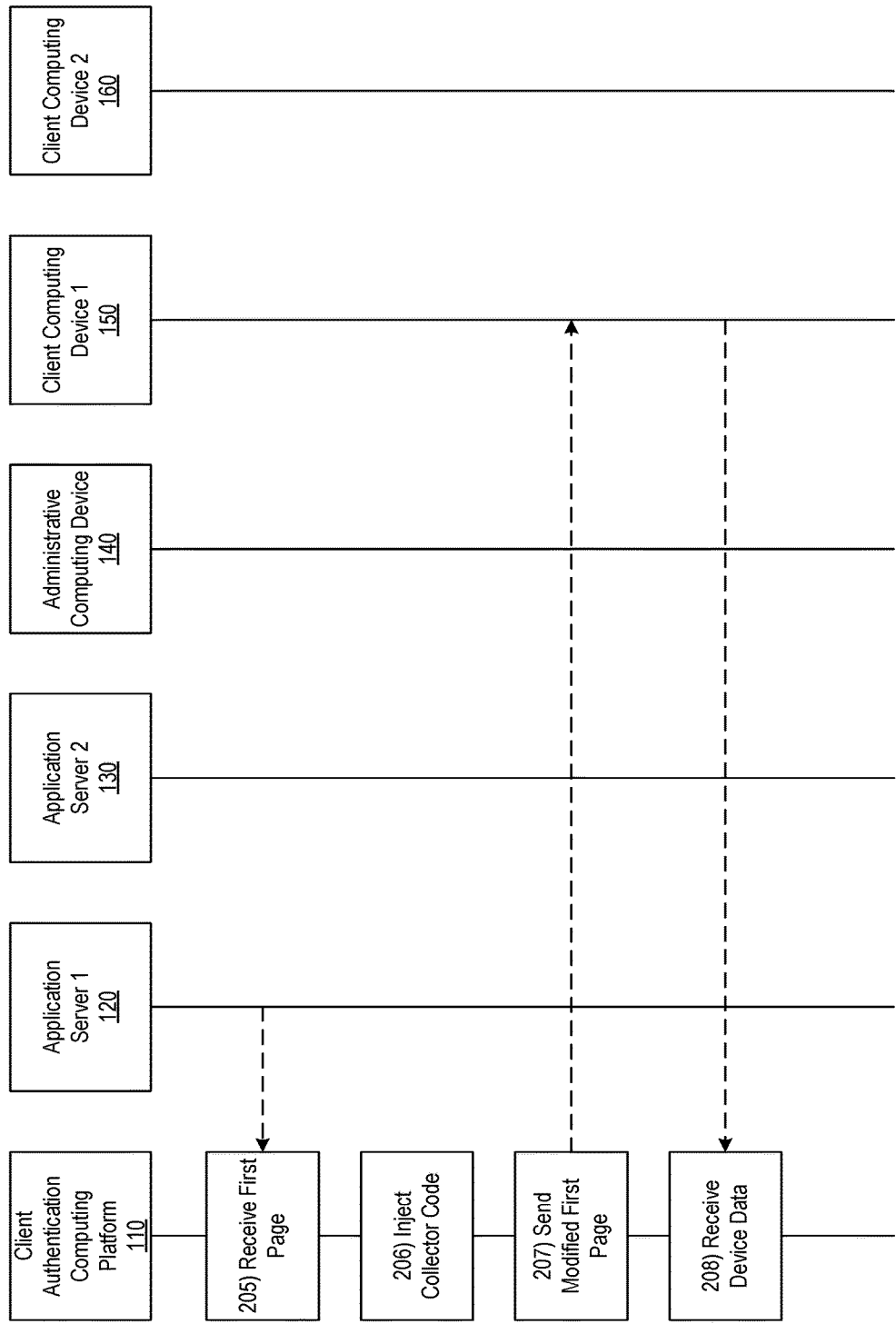

Referring to FIG. 2B, at step 205, client authentication computing platform 110 may receive the first page (e.g., header data, content data, and/or other data defining and/or otherwise associated with the first page) from application server 120. For example, at step 205, client authentication computing platform 110 may receive, via the communication interface (e.g., communication interface 115), from the first application server (e.g., application server 120), the first page associated with the first uniform resource locator.

At step 206, client authentication computing platform 110 may inject collector code into the first page. For example, at step 206, client authentication computing platform 110 may generate a modified version of the first page associated with the first uniform resource locator by injecting first collector code into source code defining the first page associated with the first uniform resource locator. For instance, in injecting the collector code into the first page, client authentication computing platform 110 may select and/or load predefined collector code from a library of collector code (which may, e.g., store and/or maintain code defining a plurality of different device data collectors) and insert the selected and/or loaded collector code into the source code of the first page received from application server 120. For example, client authentication computing platform 110 may insert the selected and/or loaded collector code into the header code of the first page, the body code of the first page, and/or any other portion of the source code of the first page received from application server 120. The first collector code may, for instance, correspond to and/or define a first device data collector that is configured to be executed by a client computing device (e.g., client computing device 150) that views and/or executes the first page. Such a device data collector may, for instance, be configured to collect device state information and/or other attributes from the client computing device (e.g., client computing device 150) that views and/or executes the first page, such as device state information indicating whether the device is jailbroken and/or rooted, information indicating what applications are installed and/or running on the device, information indicating a version and/or type of an operating system installed and/or running on the device, information indicating what networks the device is connected to, information indicating a current location of the device, and/or other state information associated with the device.

By implementing an arrangement in which client authentication computing platform 110 injects collector code into the requested page before it is served to a client device, such as client computing device 150 (e.g., as illustrated here in the example event sequence), an organization operating client authentication computing platform 110 and/or one or more client portals may be able to more efficiently and effectively manage and serve one or more pages of the one or more client portals, as collector code can be dynamically injected into client portal pages rather than having to be hard-coded into each individual page of a client portal. This arrangement may provide a more effective, efficient, scalable, and convenient technical solution to the technical problems encountered when deploying and implementing device data collectors, as this solution may enable the organization operating client authentication computing platform 110 to swap out and/or otherwise modify the collector (s) implemented on one or more specific pages. Additionally, this arrangement may provide a more effective, efficient, scalable, and convenient technical solution to the technical problems encountered when deploying and implementing device data collectors, as this solution may enable the organization operating client authentication computing platform 110 to centrally and uniformly update and/or otherwise manage all of the device data collectors that may be used across various different pages of one or more client portals (e.g., without having to update each individual page or even groups of pages that may be generated by different application servers, such as application server 120 and application server 130).

Figure 4:
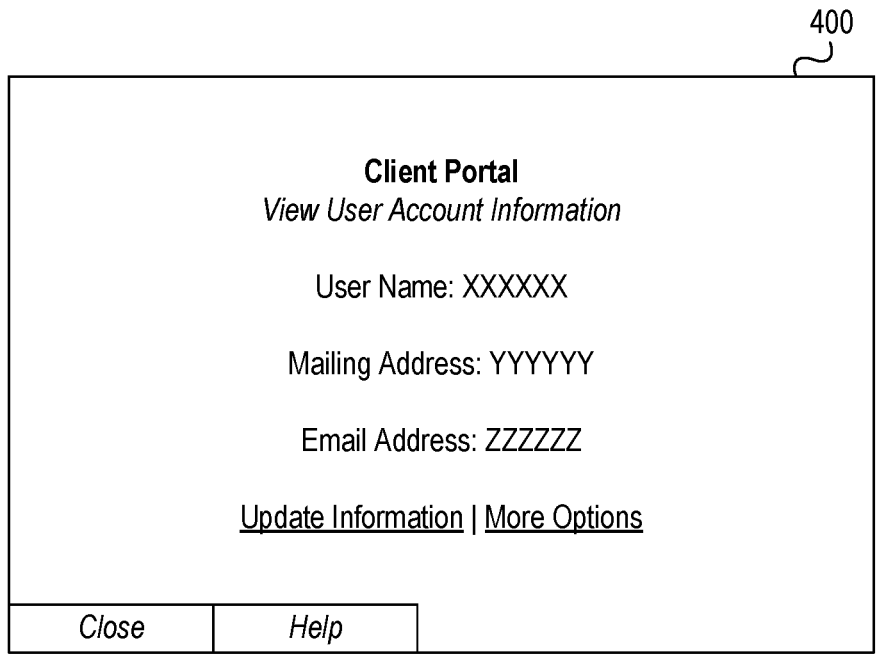
FIGS. 4-13 depict example graphical user interfaces for preventing unauthorized access to secured information systems by injecting device data collectors in accordance with one or more example embodiments.

At step 207, client authentication computing platform 110 may send the modified first page to client computing device 150. For example, at step 207, client authentication computing platform 110 may send, via the communication interface (e.g., communication interface 115), to the first client computing device (e.g., client computing device 150), the modified version of the first page associated with the first uniform resource locator. In sending the modified version of the first page associated with the first uniform resource locator to client computing device 150, client authentication computing platform 110 may direct and/or otherwise cause client computing device 150 to display and/or otherwise present the modified version of the first page associated with the first uniform resource locator. For example, in directing and/or otherwise causing client computing device 150 to display and/or otherwise present the modified version of the first page associated with the first uniform resource locator, client authentication computing platform 110 may direct and/or otherwise cause client computing device 150 to display and/or otherwise present a graphical user interface similar to graphical user interface 400, which is illustrated in FIG. 4. As seen in FIG. 4, graphical user interface 400 may include text and/or other information associated with the first page associated with the first uniform resource locator. For example, the first page associated with the first uniform resource locator may include a menu allowing a user interacting with graphical user interface 400 to view user account information, and graphical user interface 400 may include information identifying current user account information, such as a username, mailing address, and/or email address associated with the user account, and one or more user-selectable links and/or other controls that, when invoked, may enable a user interacting with graphical user interface 400 to update user account information and/or view one or more other options.

At step 208, client authentication computing platform 110 may receive device data from client computing device 150. For example, at step 208, client authentication computing platform 110 may receive, via the communication interface (e.g., communication interface 115), from the first client computing device (e.g., client computing device 150), device data collected by a first device data collector associated with the first collector code injected into the source code defining the first page associated with the first uniform resource locator. In some instances, in addition to receiving device data from client computing device 150 and/or in response to receiving device data from client computing device 150 (e.g., at step 208), client authentication computing platform 110 also may determine a security state of the first client computing device (e.g., client computing device 150) based on the device data collected by the first device data collector.

In some embodiments, determining the security state of the first client computing device based on the device data collected by the first device data collector may include analyzing the device data collected by the first device data collector. For example, in determining the security state of the first client computing device (e.g., client computing device 150) based on the device data collected by the first device data collector, client authentication computing platform 110 may analyze the device data collected by the first device data collector. Stated differently, in some instances, client authentication computing platform 110 itself may analyze the device data collected by the first device data collector to determine the security state of client computing device 150 (e.g., instead of and/or in addition to sending the device data collected by the first device data collector to one or more other servers or devices for analysis and/or other processing).

In some embodiments, determining the security state of the first client computing device based on the device data collected by the first device data collector may include: sending the device data collected by the first device data collector to a first collector support server associated with the first device data collector; and receiving, from the first collector support server associated with the first device data collector, collector results data identifying the security state of the first client computing device. For example, in determining the security state of the first client computing device (e.g., client computing device 150) based on the device data collected by the first device data collector, client authentication computing platform 110 may send the device data collected by the first device data collector to a first collector support server associated with the first device data collector (e.g., collector support server 170). In addition, client authentication computing platform 110 may receive, from the first collector support server associated with the first device data collector (e.g., collector support server 170), collector results data identifying the security state of the first client computing device (e.g., client computing device 150). Stated differently, in some instances, client authentication computing platform 110 may send the device data collected by the first device data collector to one or more other servers or devices for analysis and/or other processing to determine the security state of client computing device 150 (e.g., instead of client authentication computing platform 110 analyzing the device data collected by the first device data collector itself).

Referring to FIG. 2C, at step 209, client authentication computing platform 110 may intercept a request corresponding to a selection from client computing device 150. For example, at step 209, client authentication computing platform 110 may intercept a request corresponding to a selection of an interface element included in the modified version of the first page associated with the first uniform resource locator. For instance, in intercepting such a request, client authentication computing platform 110 may receive, from client computing device 150, a request corresponding to client computing device 150 and/or a user of client computing device 150 selecting and/or otherwise invoking a specific link, control, menu option, form, or other interface element included in the modified version of the first page sent to client computing device 150 by client authentication computing platform 110. For example, client authentication computing platform 110 may intercept and/or otherwise receive from client computing device 150 a request corresponding to a selection made by the user of client computing device 150 of the link to update user account information included in graphical user interface 400.

At step 210, client authentication computing platform 110 may validate a security state of client computing device 150. For example, at step 210, based on intercepting the request corresponding to the selection of the interface element included in the modified version of the first page associated with the first uniform resource locator, client authentication computing platform 110 may validate a security state of the first client computing device (e.g., client computing device 150) based on the device data collected by the first device data collector. In validating the security state of the first client computing device (e.g., client computing device 150) based on the device data collected by the first device data collector, client authentication computing platform 110 may, for instance, determine whether and/or confirm that the first client computing device (e.g., client computing device 150) complies with one or more rules and/or device management policies (which may, e.g., have parameters that are evaluated using the device data collected by the first device data collector). For instance, in validating the security state of the first client computing device (e.g., client computing device 150), client authentication computing platform 110 may, for instance, determine whether and/or confirm that the first client computing device (e.g., client computing device 150) complies with one or more rules and/or device management policies preventing access to protected links and/or other protected resources from devices that are jailbroken or rooted, have one or more specific blacklisted applications installed and/or running, are connected to one or more specific blacklisted networks, are located in one or more restricted access areas, are located outside of one or more permitted access areas, and/or the like. In addition, in validating the security state of the first client computing device (e.g., client computing device 150), client authentication computing platform 110 may, for instance, evaluate the security state of the first client computing device (e.g., client computing device 150) based on device data received by client authentication computing platform 110 from one or more device data collectors and/or collector results information received by client authentication computing platform 110 from one or more collector support servers (e.g., collector support server 170, collector support server 180).

If client authentication computing platform 110 fails to validate the security state of client computing device 150 and/or otherwise determines that the security state of client computing device 150 is invalid (e.g., based on the device data collected by the first device data collector indicating that client computing device 150 is out of compliance with one or more rules and/or device management policies being evaluated and/or implemented by client authentication computing platform 110), then client authentication computing platform 110 may generate and/or send one or more error messages and may deny access to client computing device 150 and/or otherwise prevent client computing device 150 from accessing one or more resources corresponding to the selection of the interface element included in the modified version of the first page associated with the first uniform resource locator, and/or client authentication computing platform 110 may deny access to client computing device 150 and/or otherwise prevent client computing device 150 from accessing one or more other protected resources. If client authentication computing platform 110 successfully validates the security state of client computing device 150 and/or otherwise determines that the security state of client computing device 150 is valid, then the example event sequence may continue as illustrated in FIG. 2C.

At step 211, client authentication computing platform 110 may send a request for a second page to application server 120. For example, at step 211, based on validating the security state of the first client computing device (e.g., client computing device 150), client authentication computing platform 110 may send, via the communication interface (e.g., communication interface 115), to the first application server (e.g., application server 120), a request for a second page associated with the selection of the interface element. At step 212, client authentication computing platform 110 may receive the second page (e.g., header data, content data, and/or other data defining and/or otherwise associated with the second page) from application server 120. For example, at step 212, client authentication computing platform 110 may receive, via the communication interface (e.g., communication interface 115), from the first application server (e.g., application server 120), the second page associated with the selection of the interface element.

Figure 2D:
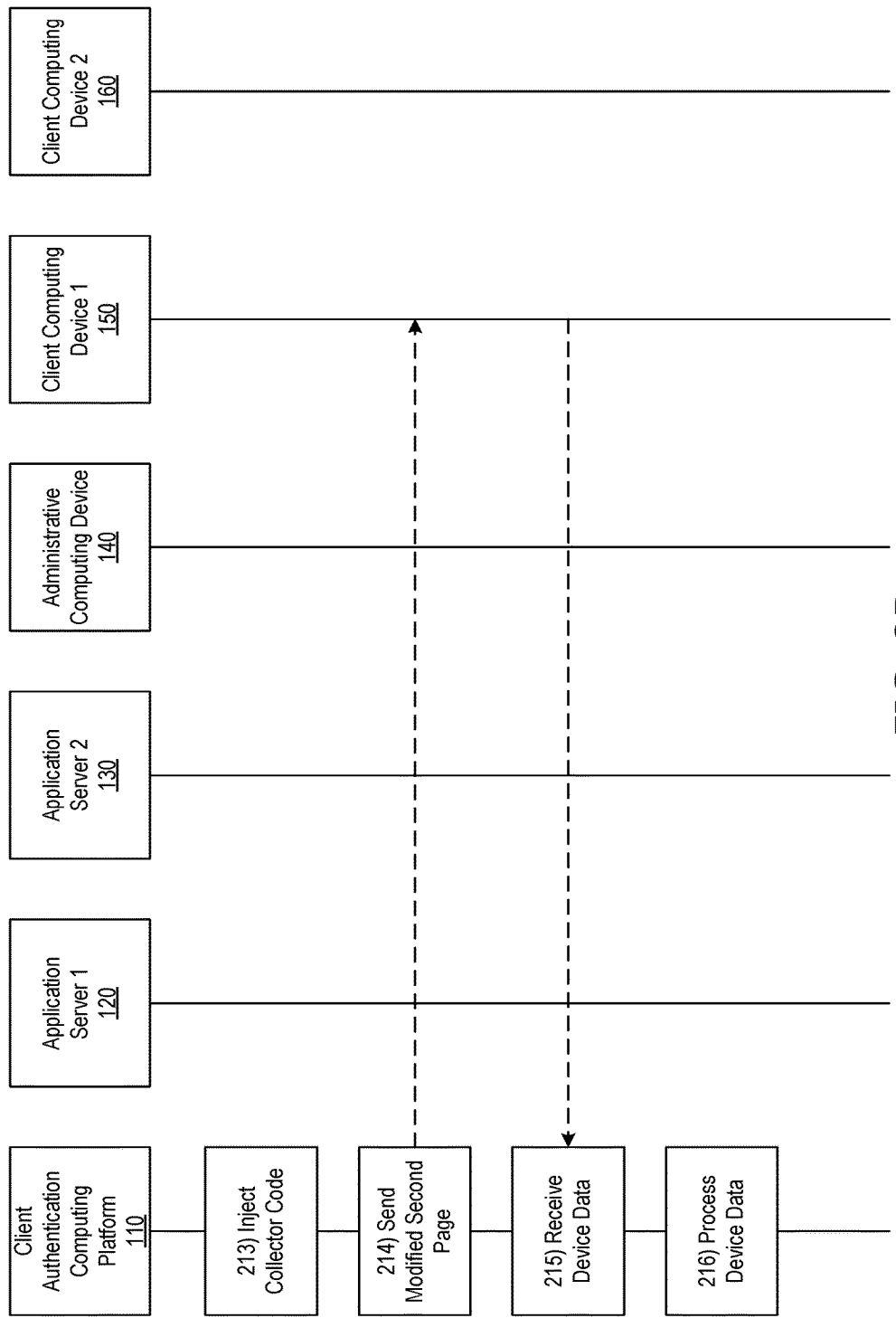

Referring to FIG. 2D, at step 213, client authentication computing platform 110 may inject collector code into the second page. For example, at step 213, client authentication computing platform 110 may generate a modified version of the second page associated with the selection of the interface element by injecting second collector code into source code defining the second page associated with the selection of the interface element. In some instances, the second collector code may correspond to the same device data collector as the first collector code injected into the first page, while in other instances, the second collector code may correspond to a different device data collector (which may, e.g., collect and/or evaluate different attributes) than the first collector code injected into the first page.

Figure 5:
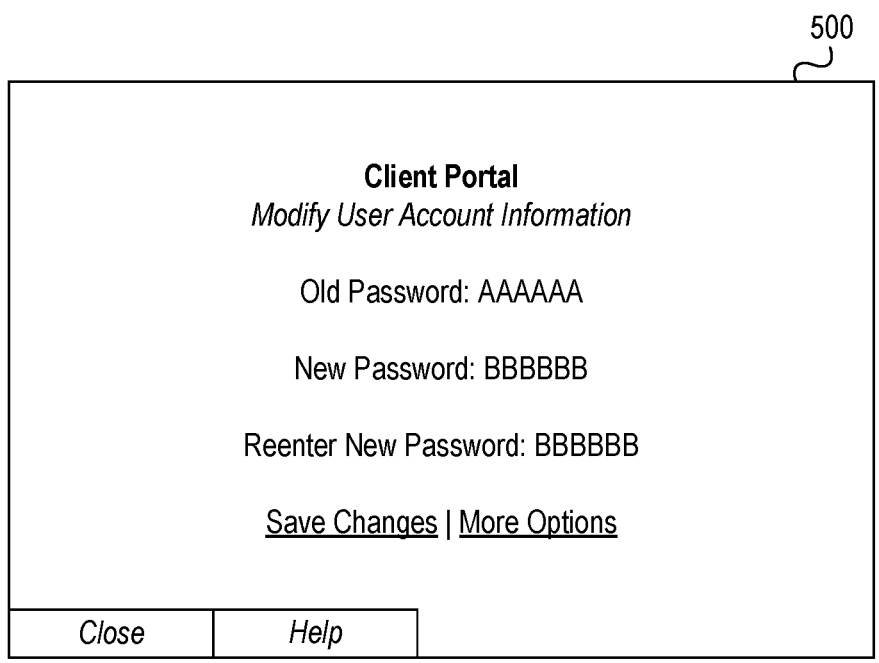

At step 214, client authentication computing platform 110 may send the modified second page to client computing device 150. For example, at step 214, client authentication computing platform 110 may send, via the communication interface (e.g., communication interface 115), to the first client computing device (e.g., client computing device 150), the modified version of the second page associated with the selection of the interface element. In sending the modified version of the second page associated with the selection of the interface element to client computing device 150, client authentication computing platform 110 may direct and/or otherwise cause client computing device 150 to display and/or otherwise present the modified version of the second page associated with the selection of the interface element. For example, in directing and/or otherwise causing client computing device 150 to display and/or otherwise present the modified version of the second page associated with the selection of the interface element, client authentication computing platform 110 may direct and/or otherwise cause client computing device 150 to display and/or otherwise present a graphical user interface similar to graphical user interface 500, which is illustrated in FIG. 5. As seen in FIG. 5, graphical user interface 500 may include text and/or other information of the second page associated with the selection of the interface element. For example, the second page associated with the selection of the interface element may include a menu allowing a user interacting with graphical user interface 500 to modify user account information, and graphical user interface 500 may include one or more fields and/or controls that, when invoked and/or modified, may enable a user interacting with graphical user interface 500 to modify user account information, such as a user account password, username, mailing address, email address, and/or other information associated with the user account.

At step 215, client authentication computing platform 110 may receive device data from client computing device 150. For example, at step 215, client authentication computing platform 110 may receive, via the communication interface (e.g., communication interface 115), from the first client computing device (e.g., client computing device 150), device data collected by a second device data collector associated with the second collector code injected into the source code defining the second page associated with the selection of the interface element. The device data collected by the second device data collector may, for instance, be received from a browser or other application that is viewing, presenting, and/or executing the source code defining the second page associated with the selection of the interface element (which may, e.g., include the injected second collector code corresponding to the second device data collector).

In some embodiments, the second device data collector associated with the second collector code injected into the source code defining the second page associated with the selection of the interface element may be different from the first device data collector associated with the first collector code injected into the source code defining the first page associated with the first uniform resource locator. For example, the second device data collector associated with the second collector code injected into the source code defining the second page associated with the selection of the interface element by client authentication computing platform 110 at step 213 may, in some instances, be different from the first device data collector associated with the first collector code injected into the source code defining the first page associated with the first uniform resource locator by client authentication computing platform 110 at step 206. In other instances, the second device data collector associated with the second collector code injected into the source code defining the second page associated with the selection of the interface element may be the same as the first device data collector associated with the first collector code injected into the source code defining the first page associated with the first uniform resource locator.

At step 216, client authentication computing platform 110 may process the device data received from client computing device 150. For example, at step 216, client authentication computing platform 110 may re-validate the security state of client computing device 150 and/or otherwise process the device data received from client computing device 150. In addition, client authentication computing platform 110 may continue to selectively allow and/or prevent access to specific functions, pages, and/or other resources of a client portal based on the security state of client computing device 150 and/or the device data received from client computing device 150.

Figure 2E:
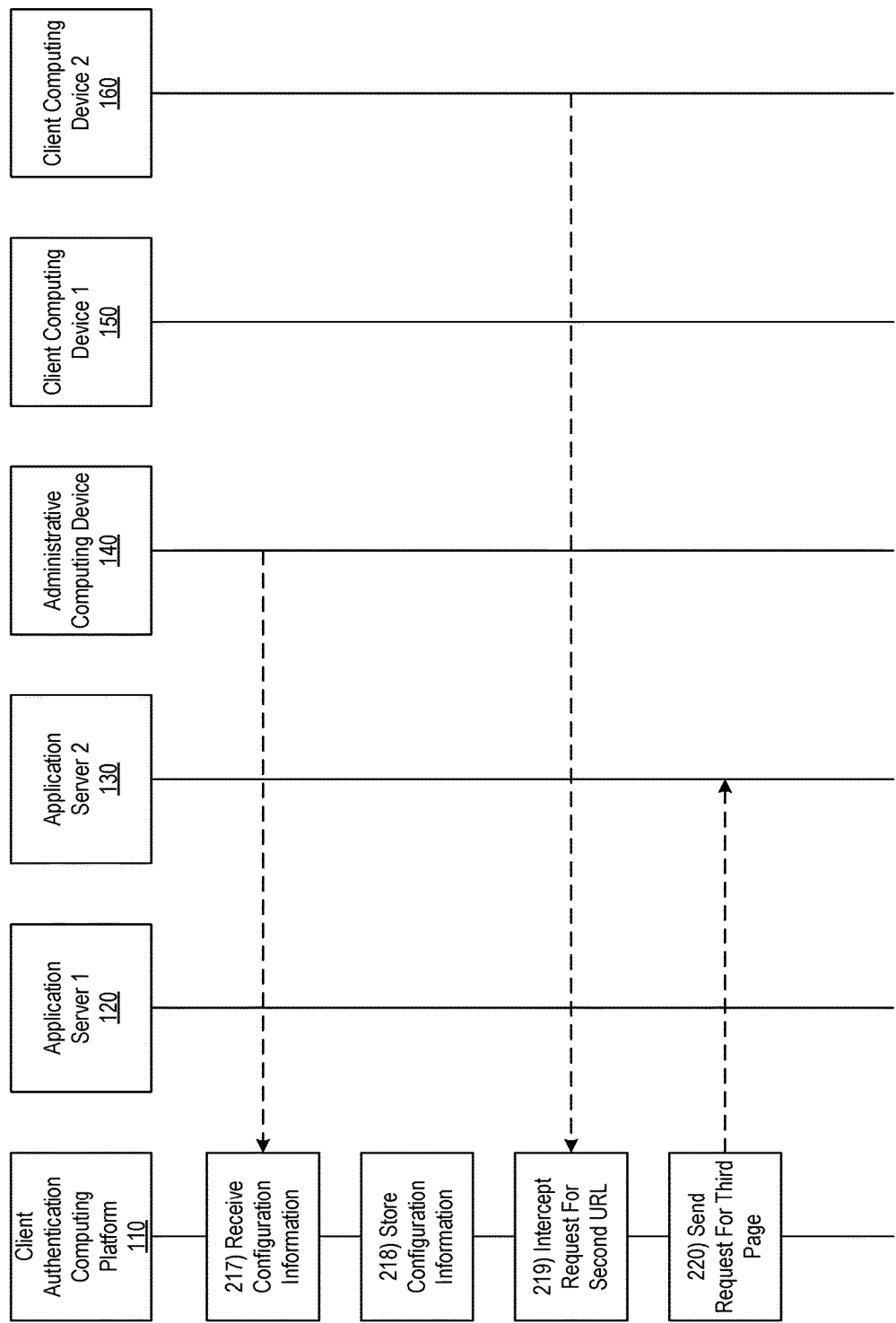

Referring to FIG. 2E, at step 217, client authentication computing platform 110 may receive configuration information from administrative computing device 140. For example, at step 217, client authentication computing platform 110 may receive, via the communication interface (e.g., communication interface 115), from an administrative computing device (e.g., administrative computing device 140), configuration information identifying a second uniform resource locator as being protected. For instance, client authentication computing platform 110 may receive configuration information from administrative computing device 140 that identifies and/or otherwise defines one or more additional protected uniform resource locators to which device fingerprinting techniques, device data collection and/or analysis techniques, and/or other secure authentication techniques are to be applied (e.g., by client authentication computing platform 110 and/or one or more other computer systems associated with an organization operating client authentication computing platform 110, such as application server 120 and application server 130). At step 218, client authentication computing platform 110 may store the configuration information received from administrative computing device 140. For example, at step 218, client authentication computing platform 110 may store, in the client authentication database (e.g., client authentication database 114), the configuration information identifying the second uniform resource locator as being protected.

At step 219, client authentication computing platform 110 may intercept a request for a second uniform resource locator. For example, at step 219, client authentication computing platform 110 may intercept a request for a second uniform resource locator from a second client computing device (e.g., client computing device 160) based on configuration information identifying the second uniform resource locator as being protected. For instance, in intercepting such a request, client authentication computing platform 110 may receive a request for the second uniform resource locator from client computing device 160 and may identify and/or otherwise determine that the second uniform resource locator is protected based on configuration information identifying the second uniform resource locator as being protected (which may, e.g., be received by client authentication computing platform 110 from administrative computing device 140 and/or be stored by client authentication computing platform 110 in client authentication database 114). In addition, the identification and/or determination of the second uniform resource locator as being protected may trigger and/or otherwise cause client authentication computing platform 110 to implement and/or otherwise apply one or more device fingerprinting techniques, device data collection and/or analysis techniques, and/or other secure authentication techniques to one or more pages associated with the second uniform resource locator in which, for instance, client authentication computing platform 110 may inject one or more device data collectors into the one or more pages associated with the second uniform resource locator, as illustrated in greater detail below.

At step 220, client authentication computing platform 110 may send a request for a third page to application server 130. For example, at step 220, based on intercepting the request for the second uniform resource locator (e.g., at step 219), client authentication computing platform 110 may send, via the communication interface (e.g., communication interface 115), to a second application server (e.g., application server 130), a request for a third page associated with the second uniform resource locator. For instance, the second uniform resource locator may correspond to the third page, and client authentication computing platform 110 may request the third page from application server 130 because the third page may be generated by application server 130 and/or an application executed on application server 130 (and subsequently served by client authentication computing platform 110 to client computing device 160). The third page may, for example, include user-specific content that is dynamically inserted and/or generated by application server 130 and/or by an application executed on application server 130 for a particular user account, which may be identified by client authentication computing platform 110 in information included in the request for the third page sent by client authentication computing platform 110 to application server 130.

Figure 2F:
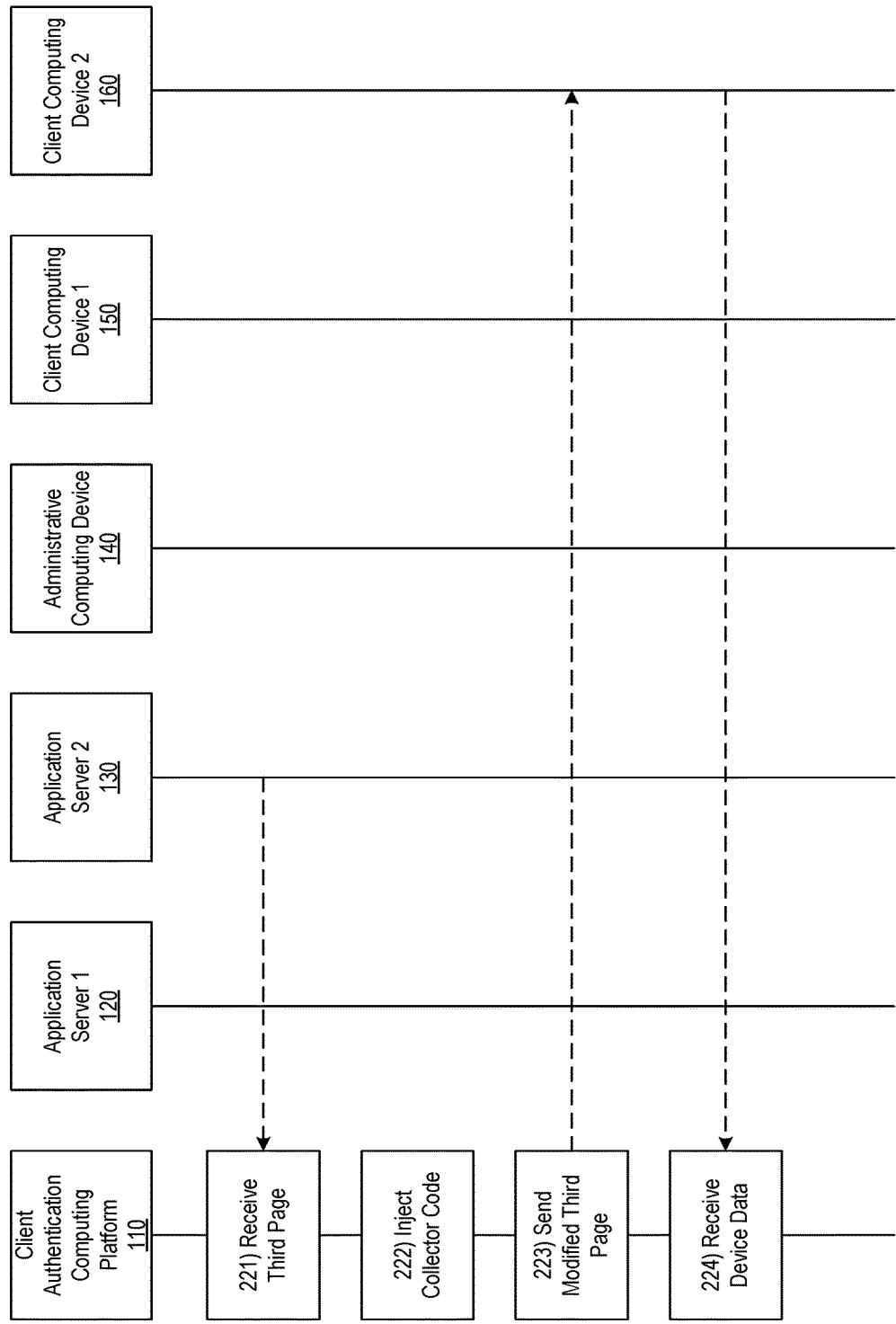

Referring to FIG. 2F, at step 221, client authentication computing platform 110 may receive the third page (e.g., header data, content data, and/or other data defining and/or otherwise associated with the third page) from application server 130. For example, at step 221, client authentication computing platform 110 may receive, via the communication interface (e.g., communication interface 115), from the second application server (e.g., application server 130), the third page associated with the second uniform resource locator.

At step 222, client authentication computing platform 110 may inject collector code into the third page. For example, at step 222, client authentication computing platform 110 may generate a modified version of the third page associated with the second uniform resource locator by injecting third collector code into source code defining the third page associated with the second uniform resource locator. For instance, in injecting the collector code into the third page, client authentication computing platform 110 may select and/or load predefined collector code from a library of collector code (which may, e.g., store and/or maintain code defining a plurality of different device data collectors) and insert the selected and/or loaded collector code into the source code of the third page received from application server 130. For example, client authentication computing platform 110 may insert the selected and/or loaded collector code into the header code of the third page, the body code of the third page, and/or any other portion of the source code of the third page received from application server 130. The third collector code may, for instance, correspond to and/or define a third device data collector that is configured to be executed by a client computing device (e.g., client computing device 160) that views and/or executes the third page. Such a device data collector may, for instance, be configured to collect device state information and/or other attributes from the client computing device (e.g., client computing device 160) that views and/or executes the third page, such as device state information indicating whether the device is jailbroken and/or rooted, information indicating what applications are installed and/or running on the device, information indicating a version and/or type of an operating system installed and/or running on the device, information indicating what networks the device is connected to, information indicating a current location of the device, and/or other state information associated with the device.

As in the example discussed above, by implementing an arrangement in which client authentication computing platform 110 injects collector code into the requested page before it is served to a client device, such as client computing device 160 (e.g., as illustrated here in the example event sequence), an organization operating client authentication computing platform 110 and/or one or more client portals may be able to more efficiently and effectively manage and serve one or more pages of the one or more client portals, as collector code can be dynamically injected into client portal pages rather than having to be hard-coded into each individual page of a client portal. This arrangement may provide a more effective, efficient, scalable, and convenient technical solution to the technical problems encountered when deploying and implementing device data collectors, as this solution may enable the organization operating client authentication computing platform 110 to swap out and/or otherwise modify the collector(s) implemented on one or more specific pages. Additionally, this arrangement may provide a more effective, efficient, scalable, and convenient technical solution to the technical problems encountered when deploying and implementing device data collectors, as this solution may enable the organization operating client authentication computing platform 110 to centrally and uniformly update and/or otherwise manage all of the device data collectors that may be used across various different pages of one or more client portals (e.g., without having to update each individual page or even groups of pages that may be generated by different application servers, such as application server 120 and application server 130).

Figure 6:
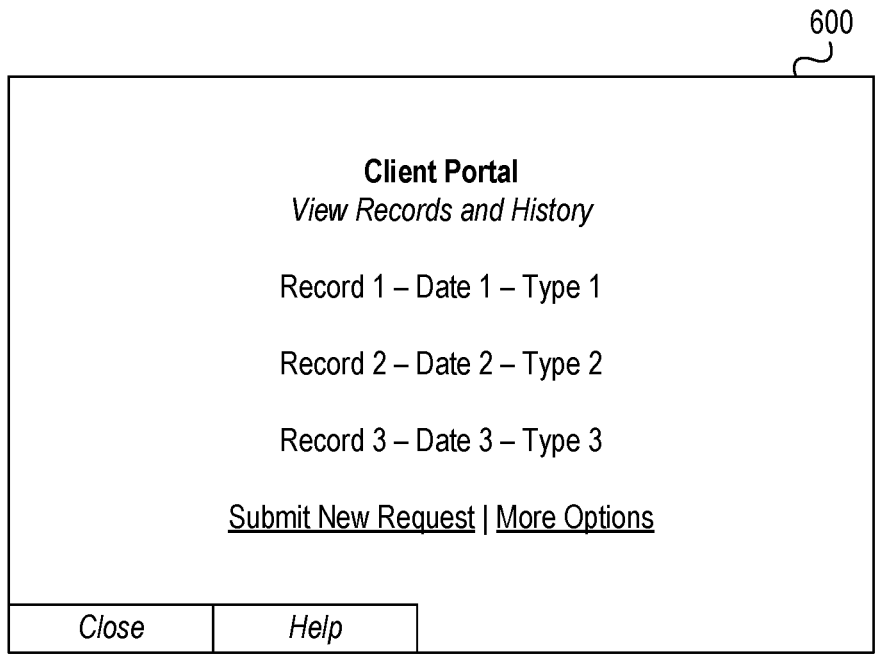

At step 223, client authentication computing platform 110 may send the modified third page to client computing device 160. For example, at step 223, client authentication computing platform 110 may send, via the communication interface (e.g., communication interface 115), to the second client computing device (e.g., client computing device 160), the modified version of the third page associated with the second uniform resource locator. In sending the modified version of the third page associated with the second uniform resource locator to client computing device 160, client authentication computing platform 110 may direct and/or otherwise cause client computing device 160 to display and/or otherwise present the modified version of the third page associated with the second uniform resource locator. For example, in directing and/or otherwise causing client computing device 160 to display and/or otherwise present the modified version of the third page associated with the second uniform resource locator, client authentication computing platform 110 may direct and/or otherwise cause client computing device 160 to display and/or otherwise present a graphical user interface similar to graphical user interface 600, which is illustrated in FIG. 6. As seen in FIG. 6, graphical user interface 600 may include text and/or other information associated with the third page associated with the second uniform resource locator. For example, the third page associated with the second uniform resource locator may include a menu allowing a user interacting with graphical user interface 600 to view user account-specific records and history information, and graphical user interface 600 may include information identifying user account-specific records and history, such as transaction records, transaction dates, transaction types, and/or other records associated with the user account, and one or more user-selectable links and/or other controls that, when invoked, may enable a user interacting with graphical user interface 600 to submit a request for a new transaction and/or view one or more other options.

At step 224, client authentication computing platform 110 may receive device data from client computing device 160. For example, at step 224, client authentication computing platform 110 may receive, via the communication interface (e.g., communication interface 115), from the second client computing device (e.g., client computing device 160), device data collected by a third device data collector associated with the third collector code injected into the source code defining the third page associated with the second uniform resource locator. In some instances, in addition to receiving device data from client computing device 160 and/or in response to receiving device data from client computing device 160 (e.g., at step 224), client authentication computing platform 110 also may determine a security state of the second client computing device (e.g., client computing device 160) based on the device data collected by the third device data collector.

In some embodiments, determining the security state of the second client computing device based on the device data collected by the third device data collector may include analyzing the device data collected by the third device data collector. For example, in determining the security state of the second client computing device (e.g., client computing device 160) based on the device data collected by the third device data collector, client authentication computing platform 110 may analyze the device data collected by the third device data collector. Stated differently, in some instances, client authentication computing platform 110 itself may analyze the device data collected by the third device data collector to determine the security state of client computing device 160 (e.g., instead of and/or in addition to sending the device data collected by the third device data collector to one or more other servers or devices for analysis and/or other processing).

In some embodiments, determining the security state of the second client computing device based on the device data collected by the third device data collector may include: sending the device data collected by the third device data collector to a second collector support server associated with the third device data collector; and receiving, from the second collector support server associated with the third device data collector, collector results data identifying the security state of the second client computing device. For example, in determining the security state of the second client computing device (e.g., client computing device 160) based on the device data collected by the third device data collector, client authentication computing platform 110 may send the device data collected by the third device data collector to a second collector support server associated with the third device data collector (e.g., collector support server 180). In addition, client authentication computing platform 110 may receive, from the second collector support server associated with the third device data collector (e.g., collector support server 180), collector results data identifying the security state of the second client computing device (e.g., client computing device 160). Stated differently, in some instances, client authentication computing platform 110 may send the device data collected by the third device data collector to one or more other servers or devices for analysis and/or other processing to determine the security state of client computing device 160 (e.g., instead of client authentication computing platform 110 analyzing the device data collected by the third device data collector itself).

Figure 2G:
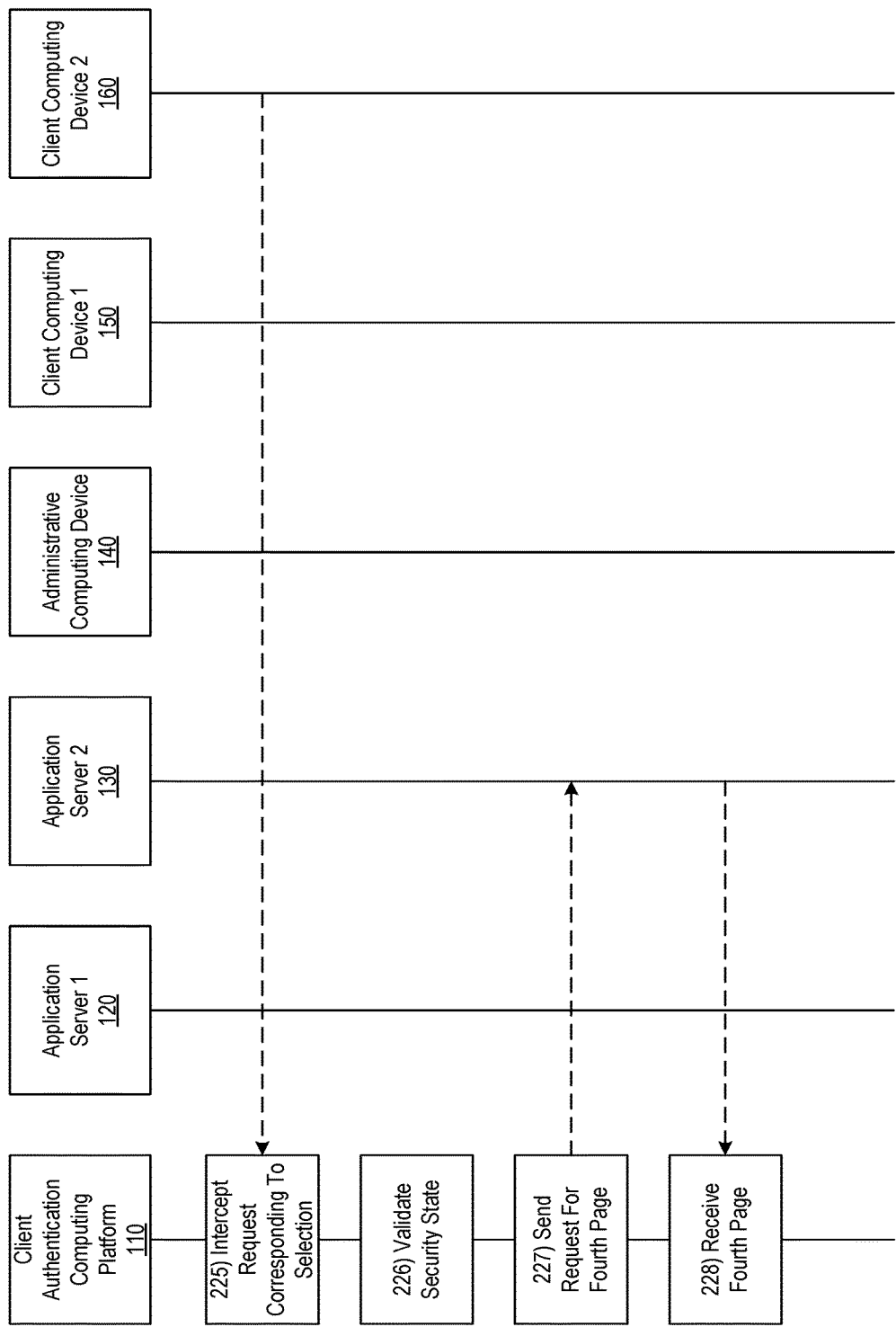

Referring to FIG. 2G, at step 225, client authentication computing platform 110 may intercept a request corresponding to a selection from client computing device 160. For example, at step 225, client authentication computing platform 110 may intercept a request corresponding to a selection of an interface element included in the modified version of the third page associated with the second uniform resource locator. For instance, in intercepting such a request, client authentication computing platform 110 may receive, from client computing device 160, a request corresponding to client computing device 160 and/or a user of client computing device 160 selecting and/or otherwise invoking a specific link, control, menu option, form, or other interface element included in the modified version of the third page sent to client computing device 160 by client authentication computing platform 110. For example, client authentication computing platform 110 may intercept and/or otherwise receive from client computing device 160 a request corresponding to a selection made by the user of client computing device 160 of the link to submit a request for a new transaction included in graphical user interface 600.

At step 226, client authentication computing platform 110 may validate a security state of client computing device 160.

For example, at step 226, based on intercepting the request corresponding to the selection of the interface element included in the modified version of the third page associated with the second uniform resource locator, client authentication computing platform 110 may validate a security state of the second client computing device (e.g., client computing device 160) based on the device data collected by the third device data collector. In validating the security state of the second client computing device (e.g., client computing device 160) based on the device data collected by the third device data collector, client authentication computing platform 110 may, for instance, determine whether and/or confirm that the second client computing device (e.g., client computing device 160) complies with one or more rules and/or device management policies (which may, e.g., have parameters that are evaluated using the device data collected by the third device data collector). For instance, in validating the security state of the second client computing device (e.g., client computing device 160), client authentication computing platform 110 may, for instance, determine whether and/or confirm that the second client computing device (e.g., client computing device 160) complies with one or more rules and/or device management policies preventing access to protected links and/or other protected resources from devices that are jailbroken or rooted, have one or more specific blacklisted applications installed and/or running, are connected to one or more specific blacklisted networks, are located in one or more restricted access areas, are located outside of one or more permitted access areas, and/or the like. In addition, in validating the security state of the second client computing device (e.g., client computing device 160), client authentication computing platform 110 may, for instance, evaluate the security state of the second client computing device (e.g., client computing device 160) based on device data received by client authentication computing platform 110 from one or more device data collectors and/or collector results information received by client authentication computing platform 110 from one or more collector support servers (e.g., collector support server 170, collector support server 180).

If client authentication computing platform 110 fails to validate the security state of client computing device 160 and/or otherwise determines that the security state of client computing device 160 is invalid (e.g., based on the device data collected by the third device data collector indicating that client computing device 160 is out of compliance with one or more rules and/or device management policies being evaluated and/or implemented by client authentication computing platform 110), then client authentication computing platform 110 may generate and/or send one or more error messages and may deny access to client computing device 160 and/or otherwise prevent client computing device 160 from accessing one or more resources corresponding to the selection of the interface element included in the modified version of the third page associated with the second uniform resource locator, and/or client authentication computing platform 110 may deny access to client computing device 160 and/or otherwise prevent client computing device 160 from accessing one or more other protected resources. If client authentication computing platform 110 successfully validates the security state of client computing device 160 and/or otherwise determines that the security state of client computing device 160 is valid, then the example event sequence may continue as illustrated in FIG. 2G.

At step 227, client authentication computing platform 110 may send a request for a fourth page to application server 130. For example, at step 227, based on validating the security state of the second client computing device (e.g., client computing device 160), client authentication computing platform 110 may send, via the communication interface (e.g., communication interface 115), to the second application server (e.g., application server 130), a request for a fourth page associated with the selection of the interface element. At step 228, client authentication computing platform 110 may receive the fourth page (e.g., header data, content data, and/or other data defining and/or otherwise associated with the fourth page) from application server 130. For example, at step 228, client authentication computing platform 110 may receive, via the communication interface (e.g., communication interface 115), from the second application server (e.g., application server 130), the fourth page associated with the selection of the interface element.

Figure 2H:
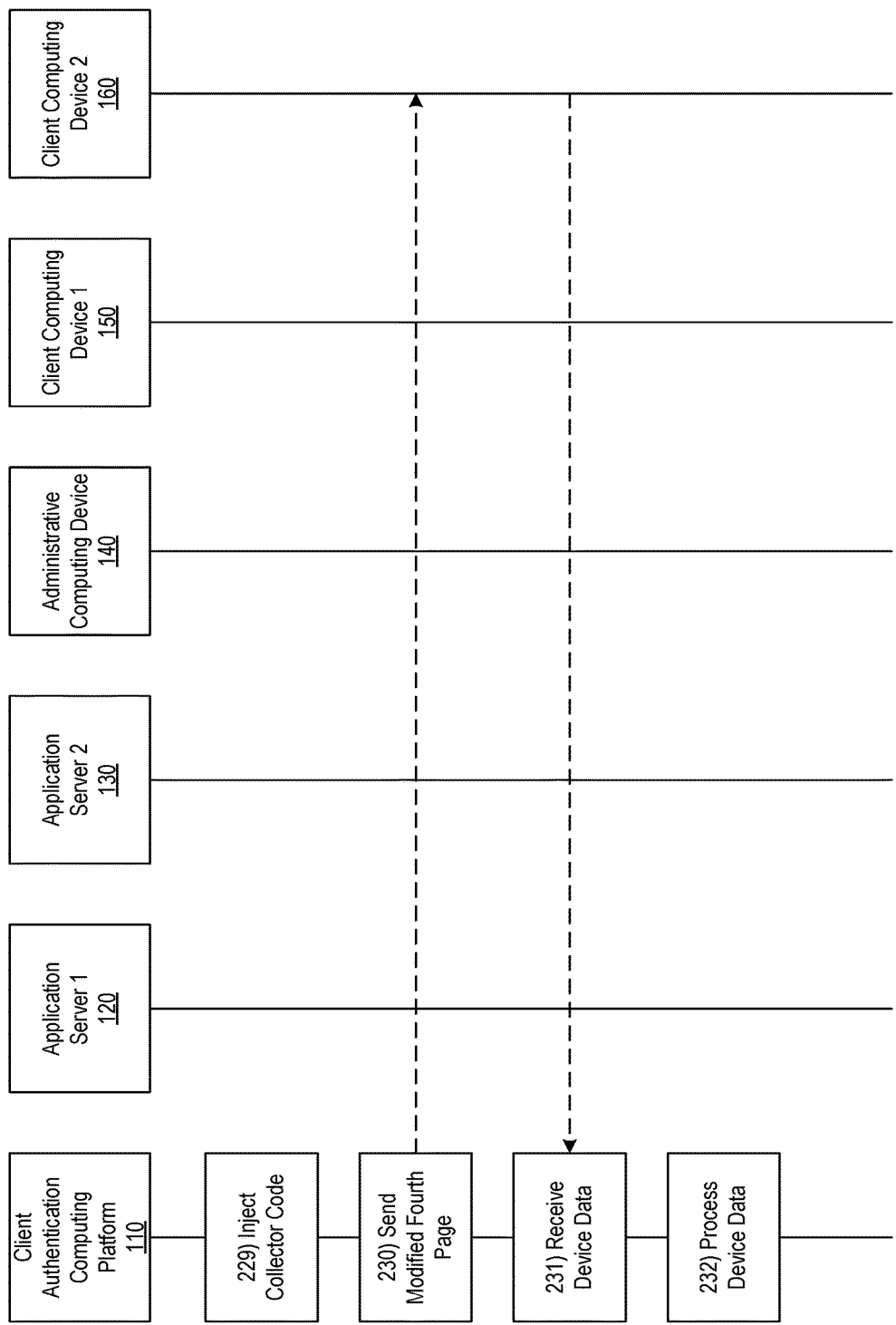

Referring to FIG. 2H, at step 229, client authentication computing platform 110 may inject collector code into the fourth page. For example, at step 229, client authentication computing platform 110 may generate a modified version of the fourth page associated with the selection of the interface element by injecting fourth collector code into source code defining the fourth page associated with the selection of the interface element. In some instances, the fourth collector code may correspond to the same device data collector as the third collector code injected into the third page, while in other instances, the fourth collector code may correspond to a different device data collector (which may, e.g., collect and/or evaluate different attributes) than the third collector code injected into the third page.

Figure 7:
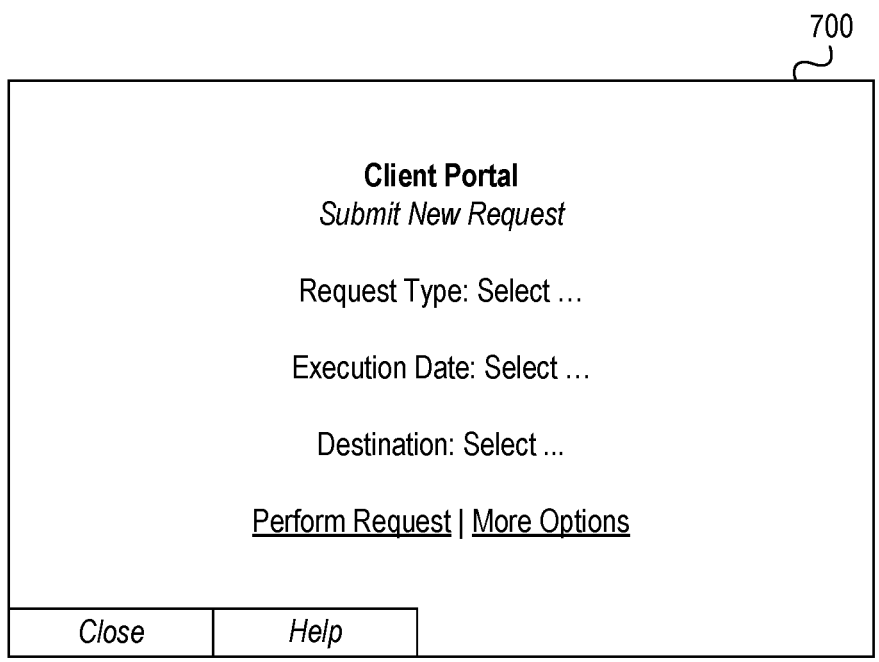

At step 230, client authentication computing platform 110 may send the modified fourth page to client computing device 160. For example, at step 230, client authentication computing platform 110 may send, via the communication interface (e.g., communication interface 115), to the second client computing device (e.g., client computing device 160), the modified version of the fourth page associated with the selection of the interface element. In sending the modified version of the fourth page associated with the selection of the interface element to client computing device 160, client authentication computing platform 110 may direct and/or otherwise cause client computing device 160 to display and/or otherwise present the modified version of the fourth page associated with the selection of the interface element. For example, in directing and/or otherwise causing client computing device 160 to display and/or otherwise present the modified version of the fourth page associated with the selection of the interface element, client authentication computing platform 110 may direct and/or otherwise cause client computing device 160 to display and/or otherwise present a graphical user interface similar to graphical user interface 700, which is illustrated in FIG. 7. As seen in FIG. 7, graphical user interface 700 may include text and/or other information of the fourth page associated with the selection of the interface element. For example, the fourth page associated with the selection of the interface element may include a menu allowing a user interacting with graphical user interface 700 to submit a request for a new transaction, and graphical user interface 700 may include one or more fields and/or controls that, when invoked and/or modified, may enable a user interacting with graphical user interface 700 to specify, identify and/or otherwise input one or more parameters of a request for a new transaction, such as a request type parameter, an execution date parameter, a destination parameter, and/or other information associated with the request for the new transaction.

At step 231, client authentication computing platform 110 may receive device data from client computing device 160.

For example, at step 231, client authentication computing platform 110 may receive, via the communication interface (e.g., communication interface 115), from the second client computing device (e.g., client computing device 160), device data collected by a fourth device data collector associated with the fourth collector code injected into the source code defining the fourth page associated with the selection of the interface element. The device data collected by the fourth device data collector may, for instance, be received from a browser or other application that is viewing, presenting, and/or executing the source code defining the fourth page associated with the selection of the interface element (which may, e.g., include the injected fourth collector code corresponding to the fourth device data collector).

In some embodiments, the fourth device data collector associated with the fourth collector code injected into the source code defining the fourth page associated with the selection of the interface element may be different from the third device data collector associated with the third collector code injected into the source code defining the third page associated with the second uniform resource locator. For example, the fourth device data collector associated with the fourth collector code injected into the source code defining the fourth page associated with the selection of the interface element by client authentication computing platform 110 at step 229 may be different from the third device data collector associated with the third collector code injected into the source code defining the third page associated with the second uniform resource locator by client authentication computing platform 110 at step 222. In other instances, the fourth device data collector associated with the fourth collector code injected into the source code defining the fourth page associated with the selection of the interface element may be the same as the third device data collector associated with the third collector code injected into the source code defining the third page associated with the second uniform resource locator.

At step 232, client authentication computing platform 110 may process the device data received from client computing device 160. For example, at step 232, client authentication computing platform 110 may re-validate the security state of client computing device 160 and/or otherwise process the device data received from client computing device 160. In addition, client authentication computing platform 110 may continue to selectively allow and/or prevent access to specific functions, pages, and/or other resources of a client portal based on the security state of client computing device 160 and/or the device data received from client computing device 160.

FIGS. 3A-3J depict another illustrative event sequence for preventing unauthorized access to secured information systems by injecting device data collectors in accordance with one or more example embodiments. In particular, the example event sequence shown in FIGS. 3A-3J illustrates how one or more step-up authentication prompts may be generated and/or injected to interrupt predefined page flows of a client portal based on device state information indicating that a particular client device is out of compliance with one or more policies and/or otherwise has an invalid security state.

Figure 3A:
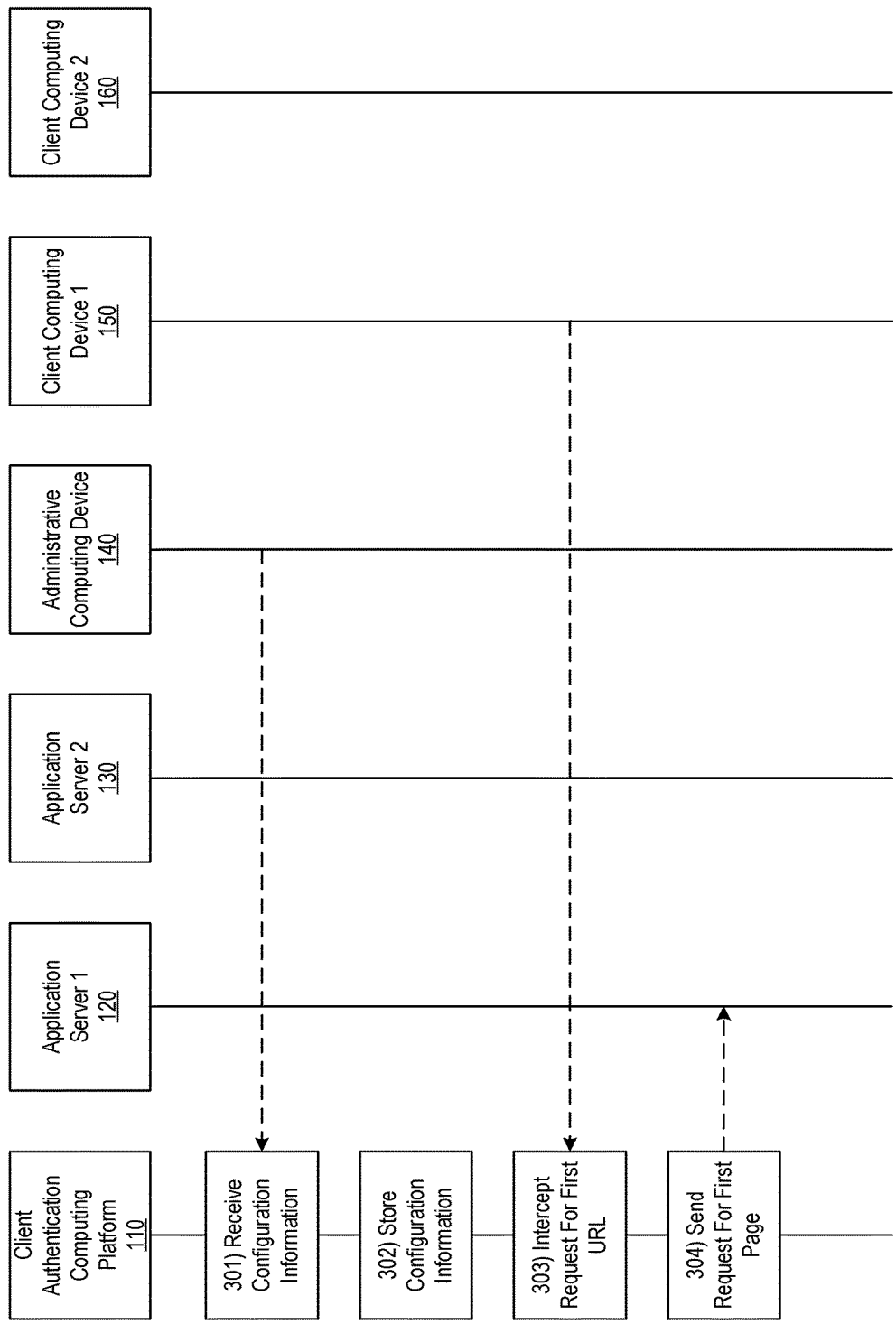
FIGS. 3A-3J depict another illustrative event sequence for preventing unauthorized access to secured information systems by injecting device data collectors in accordance with one or more example embodiments.

Referring to FIG. 3A, at step 301, client authentication computing platform 110 may receive configuration information from administrative computing device 140. For example, at step 301, client authentication computing platform 110 may receive, via a communication interface (e.g., communication interface 115), from an administrative computing device (e.g., administrative computing device 140), configuration information identifying a first uniform resource locator as being protected. For instance, client authentication computing platform 110 may receive configuration information from administrative computing device 140 that identifies and/or otherwise defines one or more protected uniform resource locators to which device fingerprinting techniques, device data collection and/or analysis techniques, and/or other secure authentication techniques are to be applied (e.g., by client authentication computing platform 110 and/or one or more other computer systems associated with an organization operating client authentication computing platform 110, such as application server 120 and application server 130). At step 302, client authentication computing platform 110 may store the configuration information received from administrative computing device 140. For example, at step 302, client authentication computing platform 110 may store, in a client authentication database (e.g., client authentication database 114), the configuration information identifying the first uniform resource locator as being protected.

At step 303, client authentication computing platform 110 may intercept a request for a first uniform locator. For example, at step 303, client authentication computing platform 110 may intercept a request for a first uniform resource locator from a first client computing device (e.g., client computing device 150) based on configuration information identifying the first uniform resource locator as being protected. For instance, in intercepting such a request, client authentication computing platform 110 may receive a request for the first uniform resource locator from client computing device 150 and may identify and/or otherwise determine that the first uniform resource locator is protected based on configuration information identifying the first uniform resource locator as being protected (which may, e.g., be received by client authentication computing platform 110 from administrative computing device 140 and/or be stored by client authentication computing platform 110 in client authentication database 114). In addition, the identification and/or determination of the first uniform resource locator as being protected may trigger and/or otherwise cause client authentication computing platform 110 to implement and/or otherwise apply one or more device fingerprinting techniques, device data collection and/or analysis techniques, and/or other secure authentication techniques to one or more pages associated with the first uniform resource locator in which, for instance, client authentication computing platform 110 may inject one or more device data collectors into the one or more pages associated with the first uniform resource locator, as illustrated in greater detail below.

At step 304, client authentication computing platform 110 may send a request for a first page to application server 120. For example, at step 304, based on intercepting the request for the first uniform resource locator (e.g., at step 303), client authentication computing platform 110 may send, via the communication interface (e.g., communication interface 115), to a first application server (e.g., application server 120), a request for a first page associated with the first uniform resource locator. For instance, the first uniform resource locator may correspond to the first page, and client authentication computing platform 110 may request the first page from application server 120 because the first page may be generated by application server 120 and/or an application executed on application server 120 (and subsequently served by client authentication computing platform 110 to client computing device 150). The first page may, for example, include user-specific content that is dynamically inserted and/or generated by application server 120 and/or by an application executed on application server 120 for a particular user account, which may be identified by client authentication computing platform 110 in information included in the request for the first page sent by client authentication computing platform 110 to application server 120.

Figure 3B:
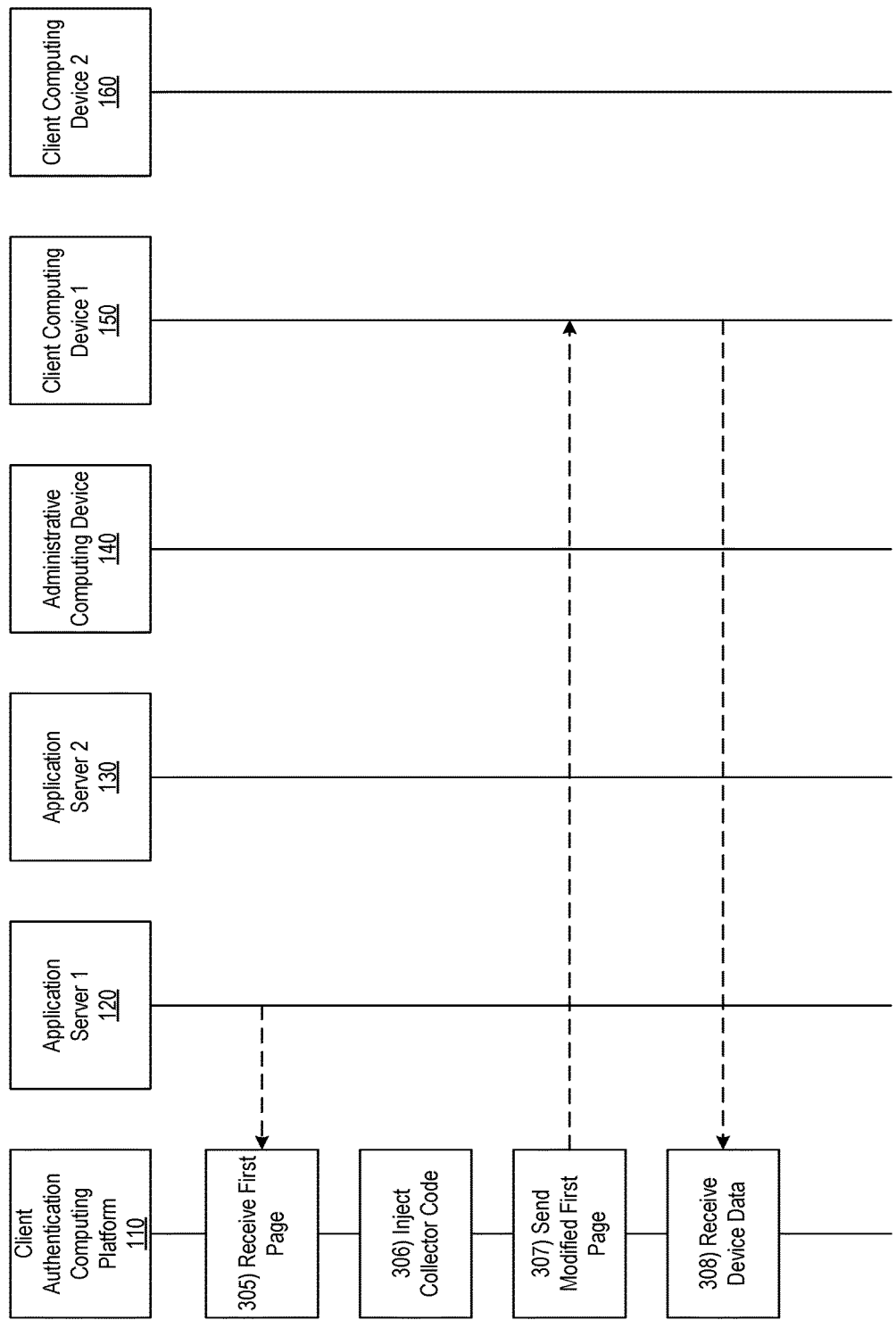

Referring to FIG. 3B, at step 305, client authentication computing platform 110 may receive the first page (e.g., header data, content data, and/or other data defining and/or otherwise associated with the first page) from application server 120. For example, at step 305, client authentication computing platform 110 may receive, via the communication interface (e.g., communication interface 115), from the first application server (e.g., application server 120), the first page associated with the first uniform resource locator.

At step 306, client authentication computing platform 110 may inject collector code into the first page. For example, at step 306, client authentication computing platform 110 may generate a modified version of the first page associated with the first uniform resource locator by injecting first collector code into source code defining the first page associated with the first uniform resource locator. For instance, in injecting the collector code into the first page, client authentication computing platform 110 may select and/or load predefined collector code from a library of collector code (which may, e.g., store and/or maintain code defining a plurality of different device data collectors) and insert the selected and/or loaded collector code into the source code of the first page received from application server 120. For example, client authentication computing platform 110 may insert the selected and/or loaded collector code into the header code of the first page, the body code of the first page, and/or any other portion of the source code of the first page received from application server 120. The first collector code may, for instance, correspond to and/or define a first device data collector that is configured to be executed by a client computing device (e.g., client computing device 150) that views and/or executes the first page. Such a device data collector may, for instance, be configured to collect device state information and/or other attributes from the client computing device (e.g., client computing device 150) that views and/or executes the first page, such as device state information indicating whether the device is jailbroken and/or rooted, information indicating what applications are installed and/or running on the device, information indicating a version and/or type of an operating system installed and/or running on the device, information indicating what networks the device is connected to, information indicating a current location of the device, and/or other state information associated with the device.

Figure 8:
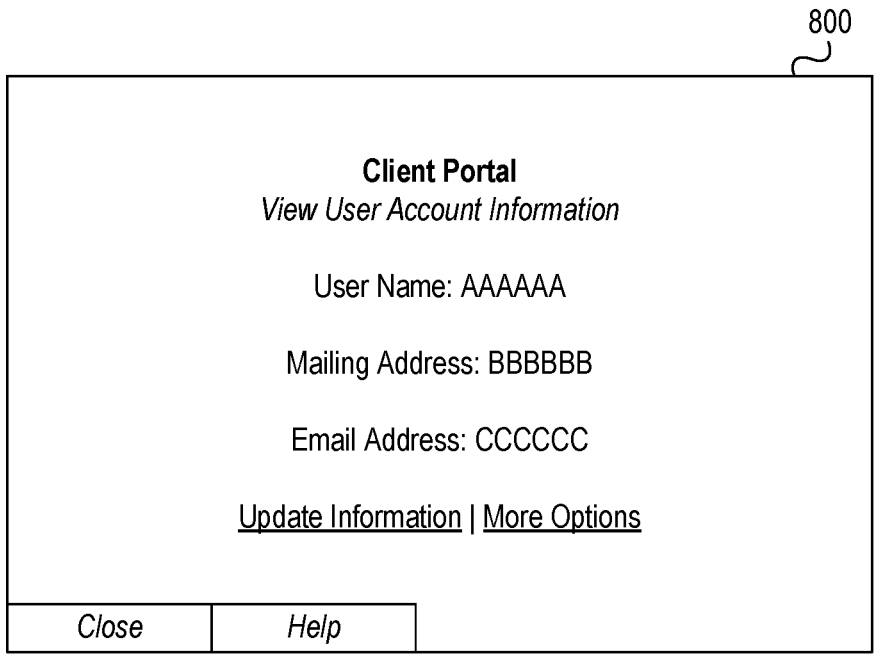

At step 307, client authentication computing platform 110 may send the modified first page to client computing device 150. For example, at step 307, client authentication computing platform 110 may send, via the communication interface (e.g., communication interface 115), to the first client computing device (e.g., client computing device 150), the modified version of the first page associated with the first uniform resource locator. In sending the modified version of the first page associated with the first uniform resource locator to client computing device 150, client authentication computing platform 110 may direct and/or otherwise cause client computing device 150 to display and/or otherwise present the modified version of the first page associated with the first uniform resource locator. For example, in directing and/or otherwise causing client computing device 150 to display and/or otherwise present the modified version of the first page associated with the first uniform resource locator, client authentication computing platform 110 may direct and/or otherwise cause client computing device 150 to display and/or otherwise present a graphical user interface similar to graphical user interface 800, which is illustrated in FIG. 8. As seen in FIG. 8, graphical user interface 800 may include text and/or other information associated with the first page associated with the first uniform resource locator. For example, the first page associated with the first uniform resource locator may include a menu allowing a user interacting with graphical user interface 800 to view user account information, and graphical user interface 800 may include information identifying current user account information, such as a username, mailing address, and/or email address associated with the user account, and one or more user-selectable links and/or other controls that, when invoked, may enable a user interacting with graphical user interface 800 to update user account information and/or view one or more other options.

At step 308, client authentication computing platform 110 may receive device data from client computing device 150. For example, at step 308, client authentication computing platform 110 may receive, via the communication interface (e.g., communication interface 115), from the first client computing device (e.g., client computing device 150), device data collected by a first device data collector associated with the first collector code injected into the source code defining the first page associated with the first uniform resource locator. In some instances, in addition to receiving device data from client computing device 150 and/or in response to receiving device data from client computing device 150 (e.g., at step 308), client authentication computing platform 110 also may determine a security state of the first client computing device (e.g., client computing device 150) based on the device data collected by the first device data collector.

Figure 3C:
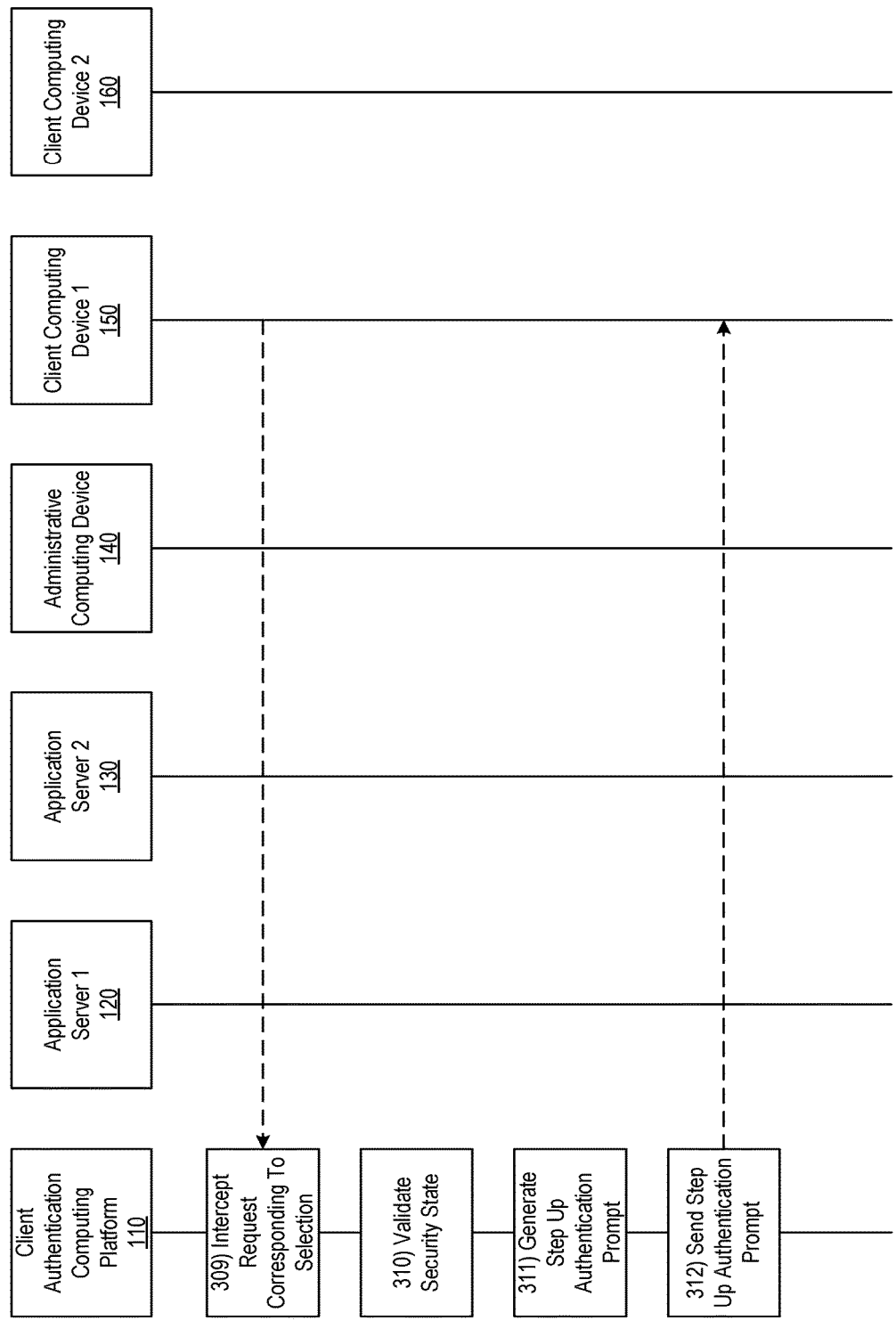

Referring to FIG. 3C, at step 309, client authentication computing platform 110 may intercept a request corresponding to a selection from client computing device 150. For example, at step 309, client authentication computing platform 110 may intercept a request corresponding to a selection of an interface element included in a modified version of a first page associated with a first uniform resource locator. For instance, in intercepting such a request, client authentication computing platform 110 may receive, from client computing device 150, a request corresponding to client computing device 150 and/or a user of client computing device 150 selecting and/or otherwise invoking a specific link, control, menu option, form, or other interface element included in the modified version of the first page sent to client computing device 150 by client authentication computing platform 110. For example, client authentication computing platform 110 may intercept and/or otherwise receive from client computing device 150 a request corresponding to a selection made by the user of client computing device 150 of the link to update user account information included in graphical user interface 800.

At step 310, client authentication computing platform 110 may validate a security state of client computing device 150. For example, at step 310, based on intercepting the request corresponding to the selection of the interface element included in the modified version of the first page associated with the first uniform resource locator, client authentication computing platform 110 may validate a security state of a first client computing device (e.g., client computing device 150) based on device data collected by a first device data collector. In validating the security state of the first client computing device (e.g., client computing device 150) based on the device data collected by the first device data collector, client authentication computing platform 110 may, for instance, determine whether and/or attempt to confirm that the first client computing device (e.g., client computing device 150) complies with one or more rules and/or device management policies (which may, e.g., have parameters that are evaluated using the device data collected by the first device data collector). For instance, in validating the security state of the first client computing device (e.g., client computing device 150), client authentication computing platform 110 may, for instance, determine whether and/or attempt to confirm that the first client computing device (e.g., client computing device 150) complies with one or more rules and/or device management policies preventing access to protected links and/or other protected resources from devices that are jailbroken or rooted, have one or more specific blacklisted applications installed and/or running, are connected to one or more specific blacklisted networks, are located in one or more restricted access areas, are located outside of one or more permitted access areas, and/or the like. In addition, in validating the security state of the first client computing device (e.g., client computing device 150), client authentication computing platform 110 may, for instance, evaluate the security state of the first client computing device (e.g., client computing device 150) based on device data received by client authentication computing platform 110 from one or more device data collectors and/or collector results information received by client authentication computing platform 110 from one or more collector support servers (e.g., collector support server 170, collector support server 180).

If client authentication computing platform 110 is able to successfully validate the security state of client computing device 150 at step 310, the event sequence may proceed to step 315. Alternatively, if client authentication computing platform 110 fails to validate the security state of client computing device 150 at step 310, the event sequence may continue as illustrated in FIG. 3C and proceed to step 311 as illustrated and as discussed in greater detail below. In particular, if client authentication computing platform 110 fails to validate the security state of client computing device 150 at step 310, client authentication computing platform 110 may proceed to generate and send a step-up authentication prompt to client computing device 150 to enable access to requested protected content, as discussed in greater detail below.

In some embodiments, validating the security state of the first client computing device based on the device data collected by the first device data collector may include determining the security state of the first client computing device based on the device data collected by the first device data collector. For example, in validating the security state of the first client computing device (e.g., client computing device 150) based on the device data collected by the first device data collector (e.g., at step 310), client authentication computing platform 110 may determine the security state of the first client computing device (e.g., client computing device 150) based on the device data collected by the first device data collector.

In some embodiments, determining the security state of the first client computing device based on the device data collected by the first device data collector may include analyzing the device data collected by the first device data collector. For example, in determining the security state of the first client computing device (e.g., client computing device 150) based on the device data collected by the first device data collector, client authentication computing platform 110 may analyze the device data collected by the first device data collector. Stated differently, in some instances, client authentication computing platform 110 itself may analyze the device data collected by the first device data collector to determine the security state of client computing device 150 (e.g., instead of and/or in addition to sending the device data collected by the first device data collector to one or more other servers or devices for analysis and/or other processing).

In some embodiments, determining the security state of the first client computing device based on the device data collected by the first device data collector may include: sending the device data collected by the first device data collector to a first collector support server associated with the first device data collector; and receiving, from the first collector support server associated with the first device data collector, collector results data identifying the security state of the first client computing device. For example, in determining the security state of the first client computing device (e.g., client computing device 150) based on the device data collected by the first device data collector, client authentication computing platform 110 may send the device data collected by the first device data collector to a first collector support server associated with the first device data collector (e.g., collector support server 170). In addition, client authentication computing platform 110 may receive, from the first collector support server associated with the first device data collector (e.g., collector support server 170), collector results data identifying the security state of the first client computing device (e.g., client computing device 150). Stated differently, in some instances, client authentication computing platform 110 may send the device data collected by the first device data collector to one or more other servers or devices for analysis and/or other processing to determine the security state of client computing device 150 (e.g., instead of client authentication computing platform 110 analyzing the device data collected by the first device data collector itself).

At step 311, client authentication computing platform 110 may generate a step-up authentication prompt for client computing device 150 (e.g., based on failing to validate the security state of client computing device 150). For example, at step 311, in response to failing to validate the security state of the first client computing device (e.g., client computing device 150) based on the device data collected by the first device data collector, client authentication computing platform 110 may generate a first step-up authentication prompt for the first client computing device (e.g., client computing device 150). In addition, the first step-up authentication prompt generated for the first client computing device (e.g., client computing device 150) may be configured to prompt a user of the first client computing device (e.g., client computing device 150) to provide authentication input to access a second page associated with the selection of the interface element. The step-up authentication prompt may, for instance, be and/or include a user interface that is generated by client authentication computing platform 110 and sent to client computing device 150 for display to user of client computing device 150. In addition, the step-up authentication prompt may, for instance, prompt and/or otherwise request the user of client computing device 150 to provide one or more specific types of authentication input, such as one-time passcode input, biometric input (e.g., fingerprint biometric input, voice biometric input, facial biometric input, retinal biometric input, and/or other biometric input), security question input, and/or the like.

By generating and/or sending such a step-up authentication prompt to a client device, such as client computing device 150, client authentication computing platform 110 may be able to dynamically allow or enable the client device (e.g., client computing device 150) to access one or more protected resources in instances where the client device (e.g., client computing device 150) does not meet current security requirements and/or policy requirements (e.g., based on the current security state of the client device being out of compliance with one or more security requirements and/or policy requirements). Thus, client authentication computing platform 110 may interrupt a predefined page flow of one or more pages of a client portal to inject a step-up authentication prompt between pages of the client portal (which may, e.g., be generated by one or more applications servers, such as application server 120 and/or application server 130) to step up and/or otherwise increase an authentication status and/or authentication level of the client device (e.g., client computing device 150) so as to subsequently provide the client device (e.g., client computing device 150) with access to one or more protected resources, such as one or more secured pages of the client portal.

In some embodiments, the first step-up authentication prompt generated for the first client computing device may include a one-time passcode authentication prompt. For example, the first step-up authentication prompt generated by client authentication computing platform 110 for the first client computing device (e.g., client computing device 150) may include a one-time passcode authentication prompt that prompts a user of the first client computing device (e.g., client computing device 150) to provide one-time passcode input and/or other authentication input.

In some embodiments, the first step-up authentication prompt generated for the first client computing device may include a biometric authentication prompt. For example, the first step-up authentication prompt generated by client authentication computing platform 110 for the first client computing device (e.g., client computing device 150) may include a biometric authentication prompt that prompts a user of the first client computing device (e.g., client computing device 150) to provide biometric input (e.g., fingerprint biometric input, voice biometric input, facial biometric input, retinal biometric input, and/or other biometric input) and/or other authentication input.

In some embodiments, the first step-up authentication prompt generated for the first client computing device may include a security question authentication prompt. For example, the first step-up authentication prompt generated by client authentication computing platform 110 for the first client computing device (e.g., client computing device 150) may include a security question authentication prompt that prompts a user of the first client computing device (e.g., client computing device 150) to provide security question response input and/or other authentication input.

Figure 9:
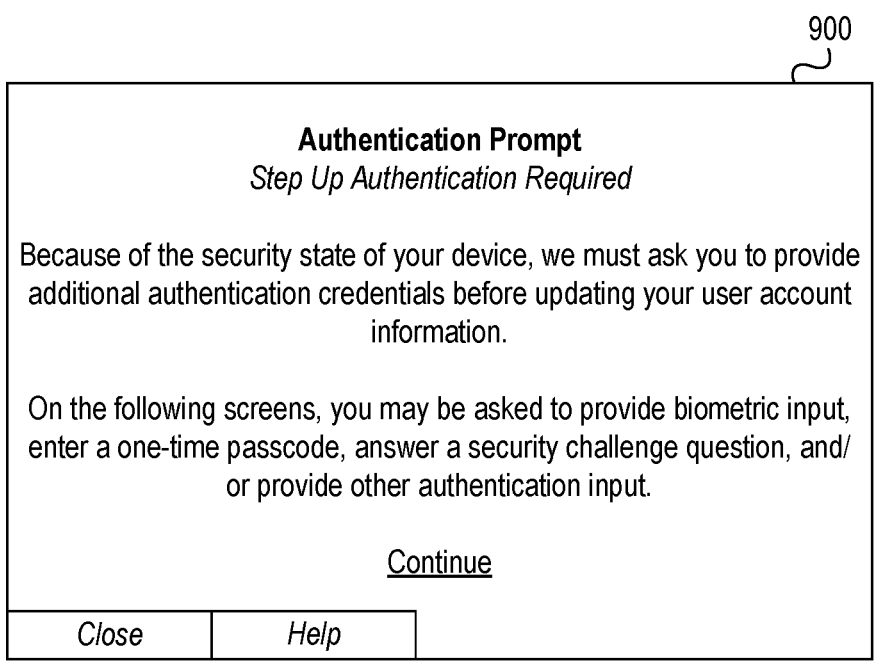

At step 312, client authentication computing platform 110 may send the step-up authentication prompt to client computing device 150. For example, at step 312, client authentication computing platform 110 may send, via the communication interface (e.g., communication interface 115), to the first client computing device (e.g., client computing device 150), the first step-up authentication prompt generated for the first client computing device (e.g., client computing device 150). In sending the first step-up authentication prompt to client computing device 150, client authentication computing platform 110 may direct and/or otherwise cause client computing device 150 to display and/or otherwise present the first step-up authentication prompt. For example, in directing and/or otherwise causing client computing device 150 to display and/or otherwise present the first step-up authentication prompt, client authentication computing platform 110 may direct and/or otherwise cause client computing device 150 to display and/or otherwise present a graphical user interface similar to graphical user interface 900, which is illustrated in FIG. 9. As seen in FIG. 9, graphical user interface 900 may include text and/or other information informing the user that step up authentication is required (e.g., "Because of the security state of your device, we must ask you to provide additional authentication credentials before updating your user account information") and/or prompting the user to provide authentication input (e.g., "On the following screens, you may be asked to provide biometric input, enter a one-time passcode, answer a security challenge question, and/or provide other authentication input").

Figure 3D:
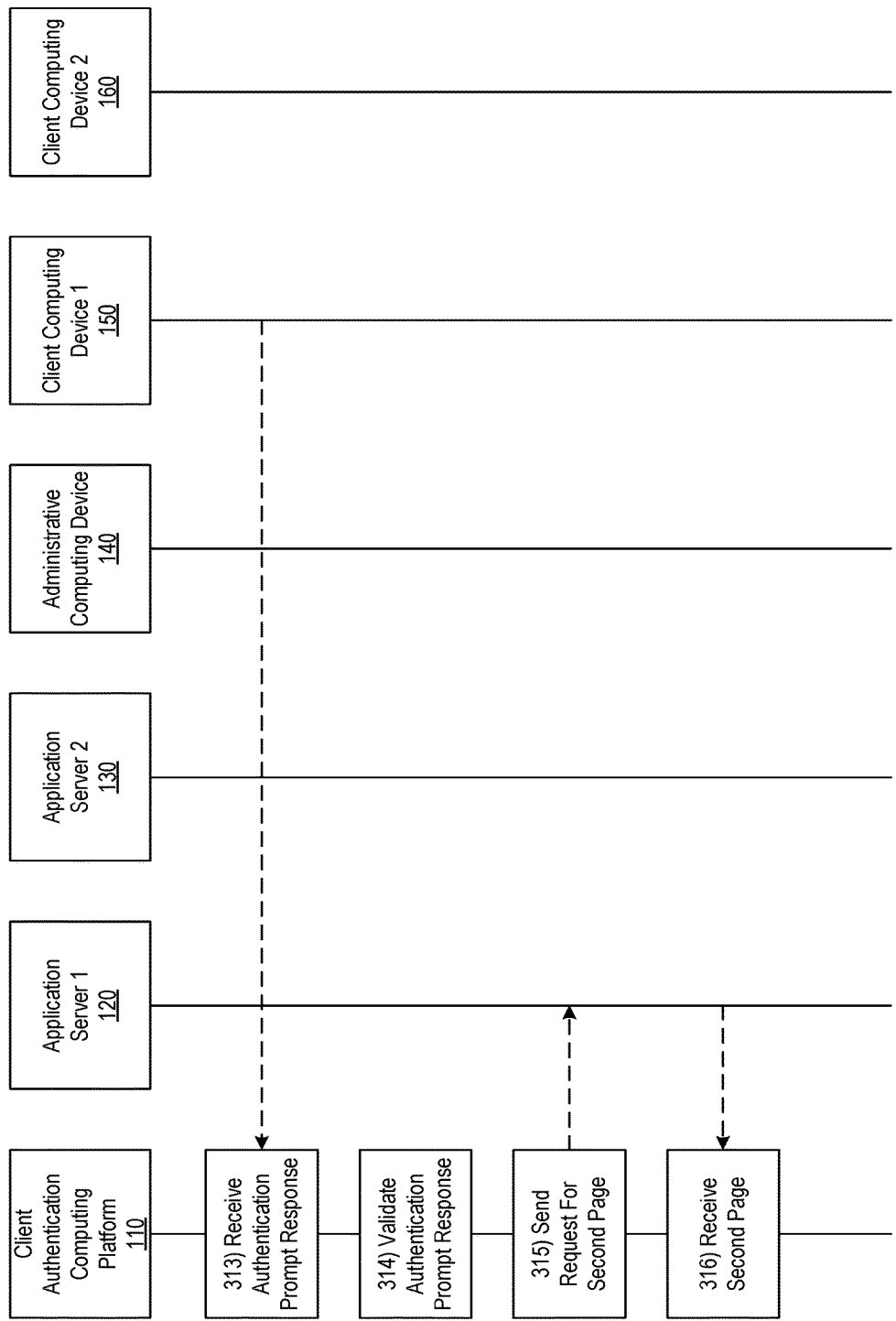

Referring to FIG. 3D, at step 313, client authentication computing platform 110 may receive a response to the authentication prompt from client computing device 150. For example, at step 313, client authentication computing platform 110 may receive, via the communication interface (e.g., communication interface 115), from the first client computing device (e.g., client computing device 150), a response to the first step-up authentication prompt generated for the first client computing device (e.g., client computing device 150). In some instances, the response to the first step-up authentication prompt received from client computing device 150 may include authentication input received by client computing device 150 from the user of client computing device 150 in response to the authentication prompt presented by client computing device 150. Additionally or alternatively, the response to the first step-up authentication prompt received from client computing device 150 may include information indicating that client computing device 150 itself successfully validated authentication input received by client computing device 150 from the user of client computing device 150 in response to the authentication prompt presented by client computing device 150.

At step 314, client authentication computing platform 110 may validate the response to the authentication prompt received from client computing device 150. For example, at step 314, client authentication computing platform 110 may validate the response to the first step-up authentication prompt received from the first client computing device (e.g., client computing device 150). In validating the response to the first step-up authentication prompt received from the first client computing device (e.g., client computing device 150), client authentication computing platform 110 may determine whether and/or confirm that valid authentication input was received by client computing device 150 and/or client authentication computing platform 110 in response to the first step-up authentication prompt generated by client authentication computing platform 110 for the first client computing device (e.g., client computing device 150). For instance, client authentication computing platform 110 may determine whether and/or confirm that valid one-time passcode input, biometric input (e.g., fingerprint biometric input, voice biometric input, facial biometric input, retinal biometric input, and/or other biometric input), security question input, and/or other authentication input was received by the first client computing device (e.g., client computing device 150) and/or by client authentication computing platform 110 in response to the first step-up authentication prompt generated by client authentication computing platform 110 for the first client computing device (e.g., client computing device 150). If client authentication computing platform 110 fails to validate the response to the first step-up authentication prompt received from the first client computing device (e.g., client computing device 150), then client authentication computing platform 110 may generate and/or send one or more error messages and may deny access to client computing device 150 and/or otherwise prevent client computing device 150 from accessing one or more resources corresponding to the selection of the interface element included in the modified version of the first page associated with the first uniform resource locator, and/or client authentication computing platform 110 may deny access to client computing device 150 and/or otherwise prevent client computing device 150 from accessing one or more other protected resources. If client authentication computing platform 110 successfully validates the response to the first step-up authentication prompt received from the first client computing device (e.g., client computing device 150), then the example event sequence may continue as illustrated in FIG. 3D.

At step 315, client authentication computing platform 110 may send a request for a second page to application server 120. For example, at step 315, based on validating the response to the first step-up authentication prompt, client authentication computing platform 110 may send, via the communication interface (e.g., communication interface 115), to a first application server (e.g., application server 120), a request for the second page associated with the selection of the interface element. At step 316, client authentication computing platform 110 may receive the second page (e.g., header data, content data, and/or other data defining and/or otherwise associated with the second page) from application server 120. For example, at step 316, client authentication computing platform 110 may receive, via the communication interface (e.g., communication interface 115), from the first application server (e.g., application server 120), the second page associated with the selection of the interface element.

Figure 3E:
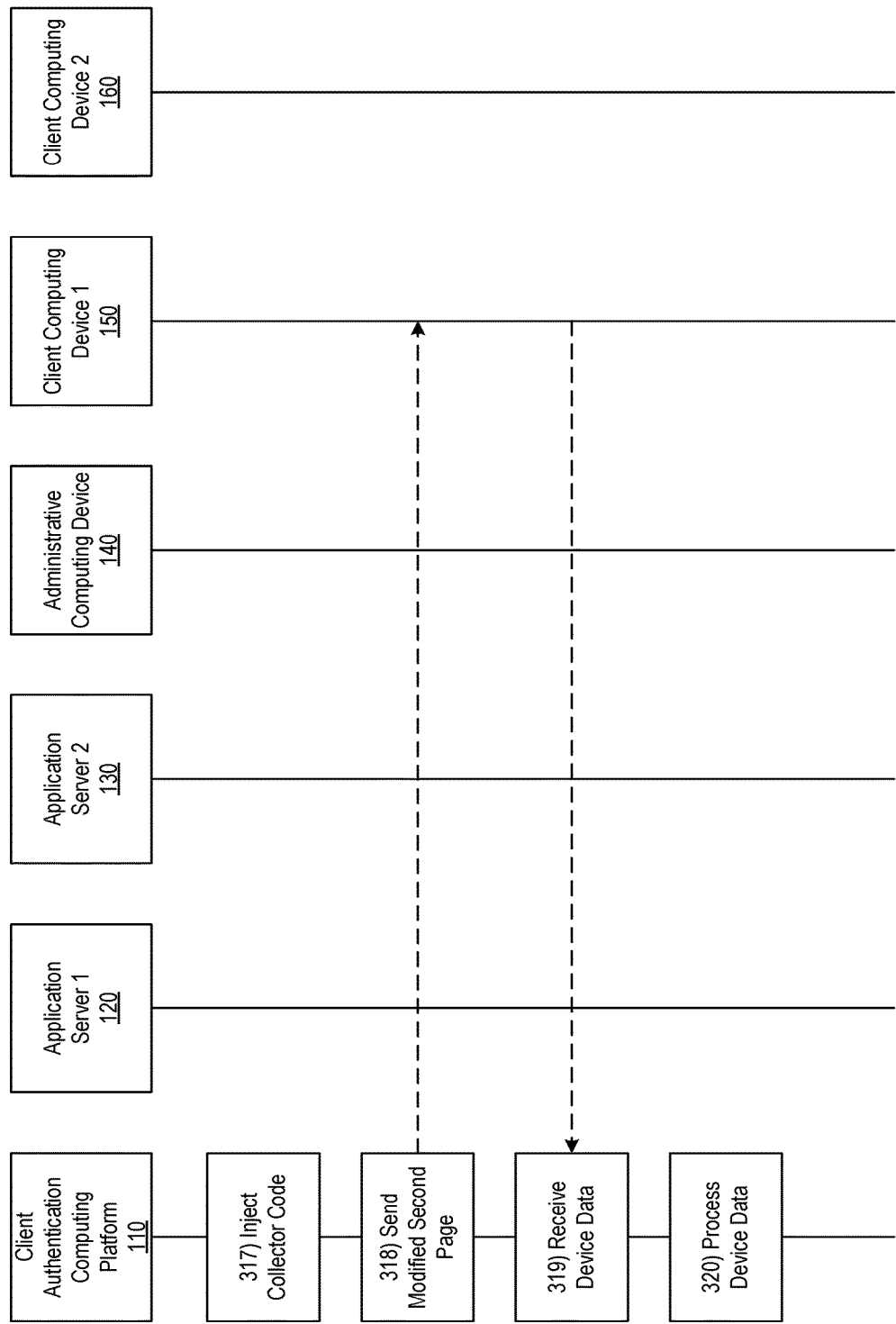

Referring to FIG. 3E, at step 317, client authentication computing platform 110 may inject collector code into the second page. For example, at step 317, client authentication computing platform 110 may generate a modified version of the second page associated with the selection of the interface element by injecting second collector code into source code defining the second page associated with the selection of the interface element. In some instances, the second collector code may correspond to the same device data collector as the first collector code injected into the first page, while in other instances, the second collector code may correspond to a different device data collector (which may, e.g., collect and/or evaluate different attributes) than the first collector code injected into the first page.

Figure 10:
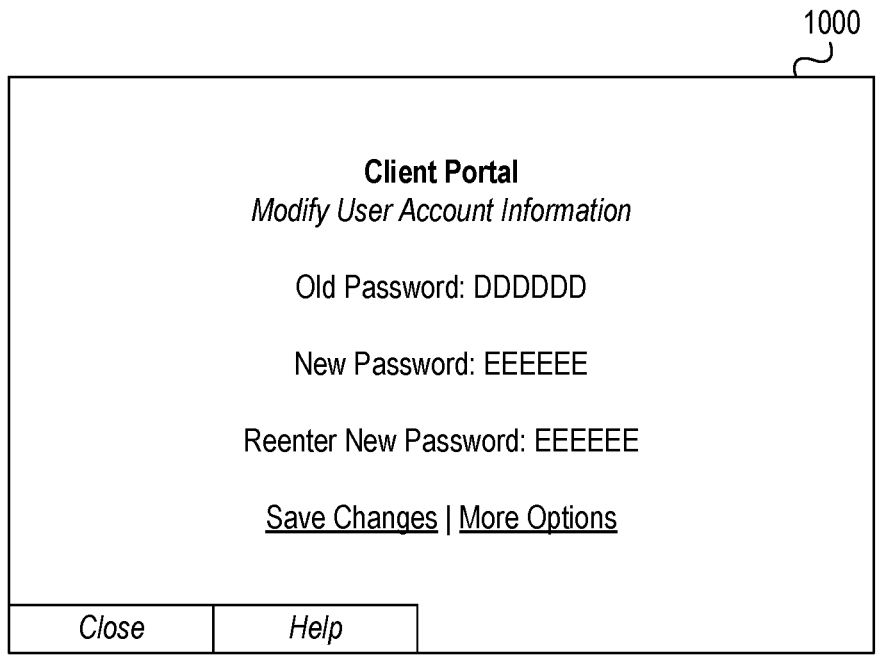

At step 318, client authentication computing platform 110 may send the modified second page to client computing device 150. For example, at step 318, client authentication computing platform 110 may send, via the communication interface (e.g., communication interface 115), to the first client computing device (e.g., client computing device 150), the modified version of the second page associated with the selection of the interface element. In sending the modified version of the second page associated with the selection of the interface element to client computing device 150, client authentication computing platform 110 may direct and/or otherwise cause client computing device 150 to display and/or otherwise present the modified version of the second page associated with the selection of the interface element. For example, in directing and/or otherwise causing client computing device 150 to display and/or otherwise present the modified version of the second page associated with the selection of the interface element, client authentication computing platform 110 may direct and/or otherwise cause client computing device 150 to display and/or otherwise present a graphical user interface similar to graphical user interface 1000, which is illustrated in FIG. 10. As seen in FIG. 10, graphical user interface 1000 may include text and/or other information of the second page associated with the selection of the interface element. For example, the second page associated with the selection of the interface element may include a menu allowing a user interacting with graphical user interface 1000 to modify user account information, and graphical user interface 1000 may include one or more fields and/or controls that, when invoked and/or modified, may enable a user interacting with graphical user interface 1000 to modify user account information, such as a user account password, username, mailing address, email address, and/or other information associated with the user account.

At step 319, client authentication computing platform 110 may receive device data from client computing device 150. For example, at step 319, client authentication computing platform 110 may receive, via the communication interface (e.g., communication interface 115), from the first client computing device (e.g., client computing device 150), device data collected by a second device data collector associated with the second collector code injected into the source code defining the second page associated with the selection of the interface element. The device data collected by the second device data collector may, for instance, be received from a browser or other application that is viewing, presenting, and/or executing the source code defining the second page associated with the selection of the interface element (which may, e.g., include the injected second collector code corresponding to the second device data collector).

At step 320, client authentication computing platform 110 may process the device data received from client computing device 150. For example, at step 320, client authentication computing platform 110 may re-validate the security state of client computing device 150 and/or otherwise process the device data received from client computing device 150. In addition, client authentication computing platform 110 may continue to selectively allow and/or prevent access to specific functions, pages, and/or other resources of a client portal based on the security state of client computing device 150 and/or the device data received from client computing device 150.

Figure 3F:
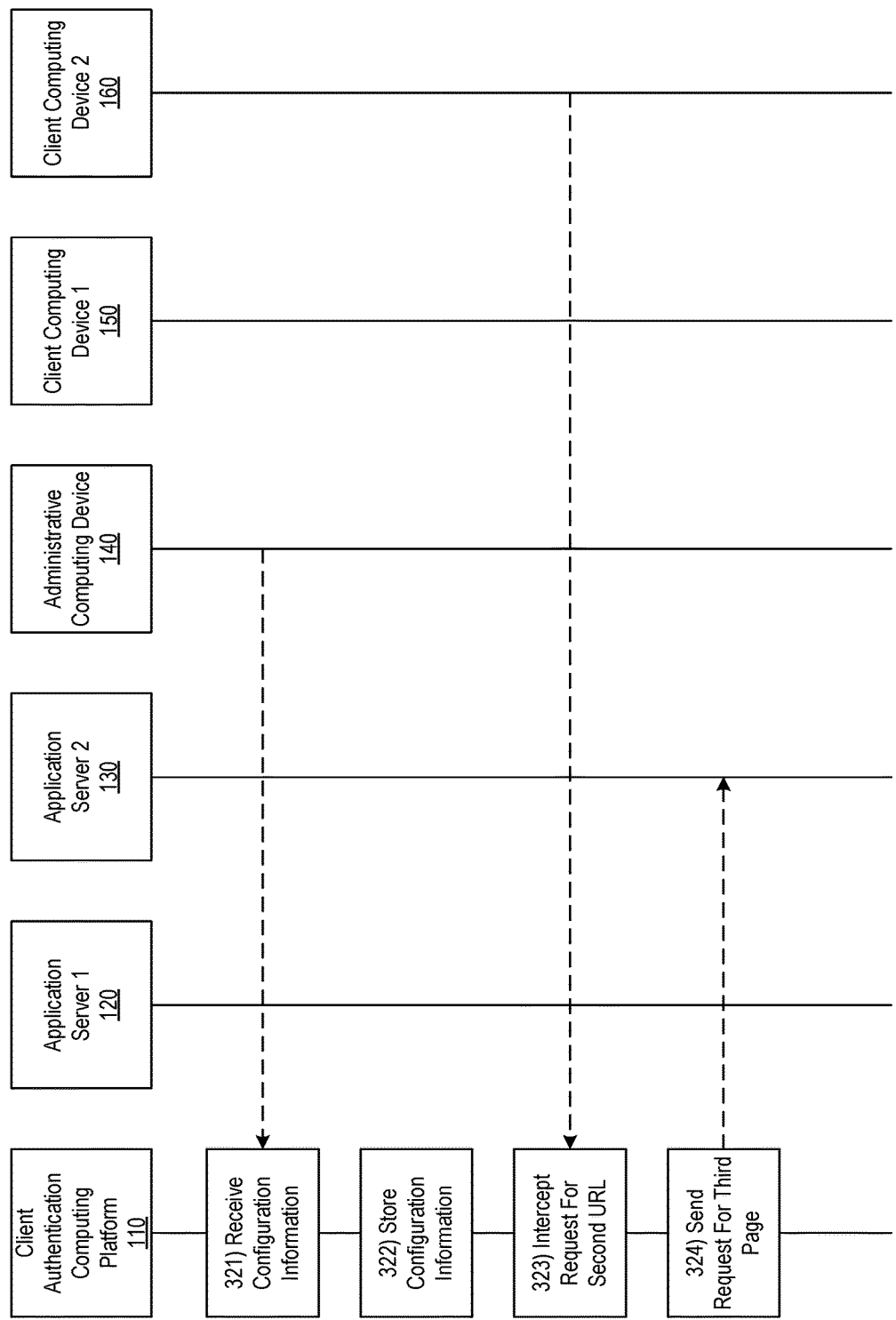

Referring to FIG. 3F, at step 321, client authentication computing platform 110 may receive configuration information from administrative computing device 140. For example, at step 321, client authentication computing platform 110 may receive, via the communication interface (e.g., communication interface 115), from an administrative computing device (e.g., administrative computing device 140), configuration information identifying a second uniform resource locator as being protected. For instance, client authentication computing platform 110 may receive configuration information from administrative computing device 140 that identifies and/or otherwise defines one or more additional protected uniform resource locators to which device fingerprinting techniques, device data collection and/or analysis techniques, and/or other secure authentication techniques are to be applied (e.g., by client authentication computing platform 110 and/or one or more other computer systems associated with an organization operating client authentication computing platform 110, such as application server 120 and application server 130). At step 322, client authentication computing platform 110 may store the configuration information received from administrative computing device 140. For example, at step 322, client authentication computing platform 110 may store, in the client authentication database (e.g., client authentication database 114), the configuration information identifying the second uniform resource locator as being protected.

At step 323, client authentication computing platform 110 may intercept a request for a second uniform resource locator. For example, at step 323, client authentication computing platform 110 may intercept a request for a second uniform resource locator from a second client computing device (e.g., client computing device 160) based on configuration information identifying the second uniform resource locator as being protected. For instance, in intercepting such a request, client authentication computing platform 110 may receive a request for the second uniform resource locator from client computing device 160 and may identify and/or otherwise determine that the second uniform resource locator is protected based on configuration information identifying the second uniform resource locator as being protected (which may, e.g., be received by client authentication computing platform 110 from administrative computing device 140 and/or be stored by client authentication computing platform 110 in client authentication database 114). In addition, the identification and/or determination of the second uniform resource locator as being protected may trigger and/or otherwise cause client authentication computing platform 110 to implement and/or otherwise apply one or more device fingerprinting techniques, device data collection and/or analysis techniques, and/or other secure authentication techniques to one or more pages associated with the second uniform resource locator in which, for instance, client authentication computing platform 110 may inject one or more device data collectors into the one or more pages associated with the second uniform resource locator, as illustrated in greater detail below.

At step 324, client authentication computing platform 110 may send a request for a third page to application server 130. For example, at step 324, based on intercepting the request for the second uniform resource locator (e.g., at step 219), client authentication computing platform 110 may send, via the communication interface (e.g., communication interface 115), to a second application server (e.g., application server 130), a request for a third page associated with the second uniform resource locator. For instance, the second uniform resource locator may correspond to the third page, and client authentication computing platform 110 may request the third page from application server 130 because the third page may be generated by application server 130 and/or an application executed on application server 130 (and subsequently served by client authentication computing platform 110 to client computing device 160). The third page may, for example, include user-specific content that is dynamically inserted and/or generated by application server 130 and/or by an application executed on application server 130 for a particular user account, which may be identified by client authentication computing platform 110 in information included in the request for the third page sent by client authentication computing platform 110 to application server 130.

Figure 3G:
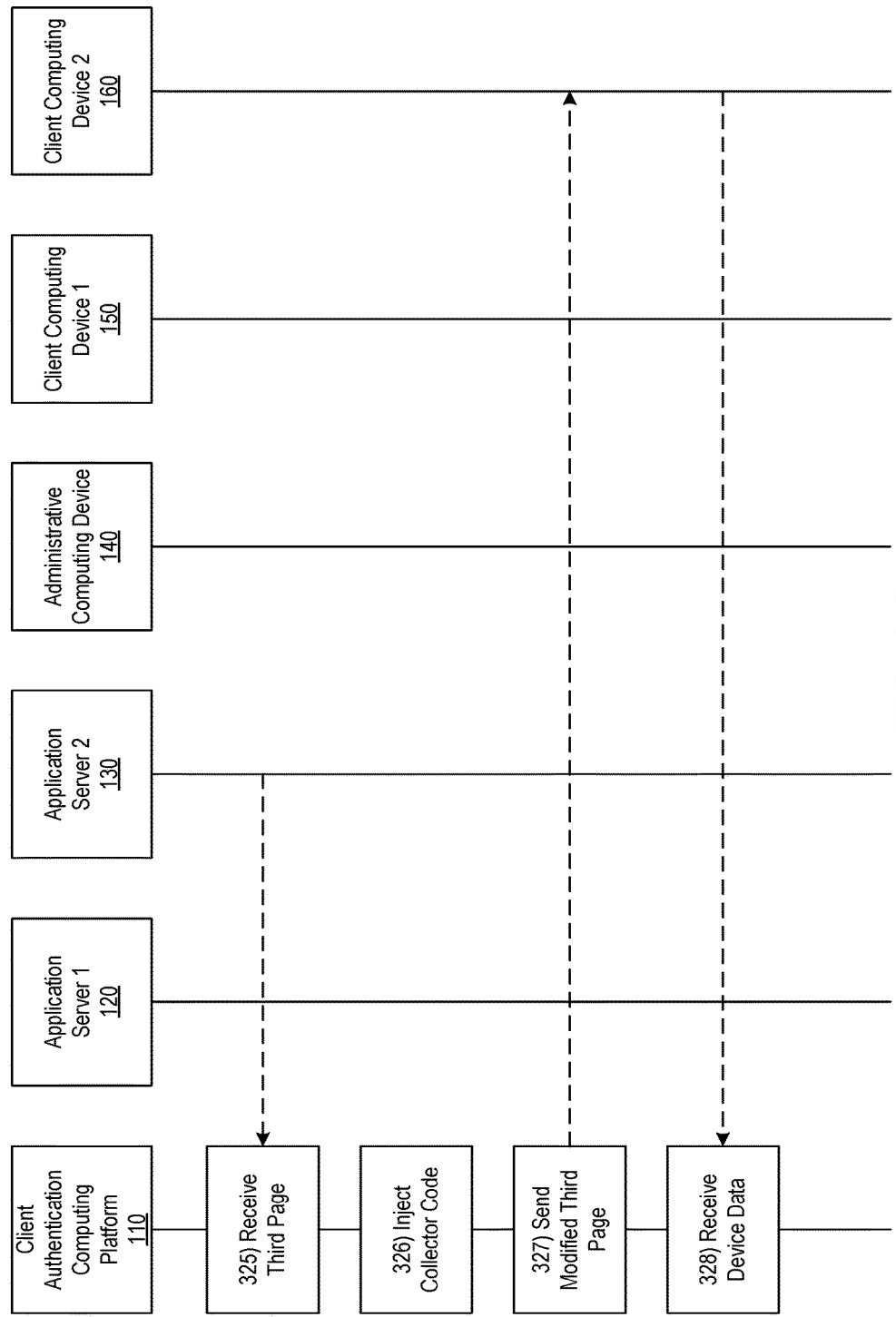

Referring to FIG. 3G, at step 325, client authentication computing platform 110 may receive the third page (e.g., header data, content data, and/or other data defining and/or otherwise associated with the third page) from application server 130. For example, at step 325, client authentication computing platform 110 may receive, via the communication interface (e.g., communication interface 115), from the second application server (e.g., application server 130), the third page associated with the second uniform resource locator.

At step 326, client authentication computing platform 110 may inject collector code into the third page. For example, at step 326, client authentication computing platform 110 may generate a modified version of the third page associated with the second uniform resource locator by injecting third collector code into source code defining the third page associated with the second uniform resource locator. For instance, in injecting the collector code into the third page, client authentication computing platform 110 may select and/or load predefined collector code from a library of collector code (which may, e.g., store and/or maintain code defining a plurality of different device data collectors) and insert the selected and/or loaded collector code into the source code of the third page received from application server 130. For example, client authentication computing platform 110 may insert the selected and/or loaded collector code into the header code of the third page, the body code of the third page, and/or any other portion of the source code of the third page received from application server 130. The third collector code may, for instance, correspond to and/or define a third device data collector that is configured to be executed by a client computing device (e.g., client computing device 160) that views and/or executes the third page. Such a device data collector may, for instance, be configured to collect device state information and/or other attributes from the client computing device (e.g., client computing device 160) that views and/or executes the third page, such as device state information indicating whether the device is jailbroken and/or rooted, information indicating what applications are installed and/or running on the device, information indicating a version and/or type of an operating system installed and/or running on the device, information indicating what networks the device is connected to, information indicating a current location of the device, and/or other state information associated with the device.

Figure 11:
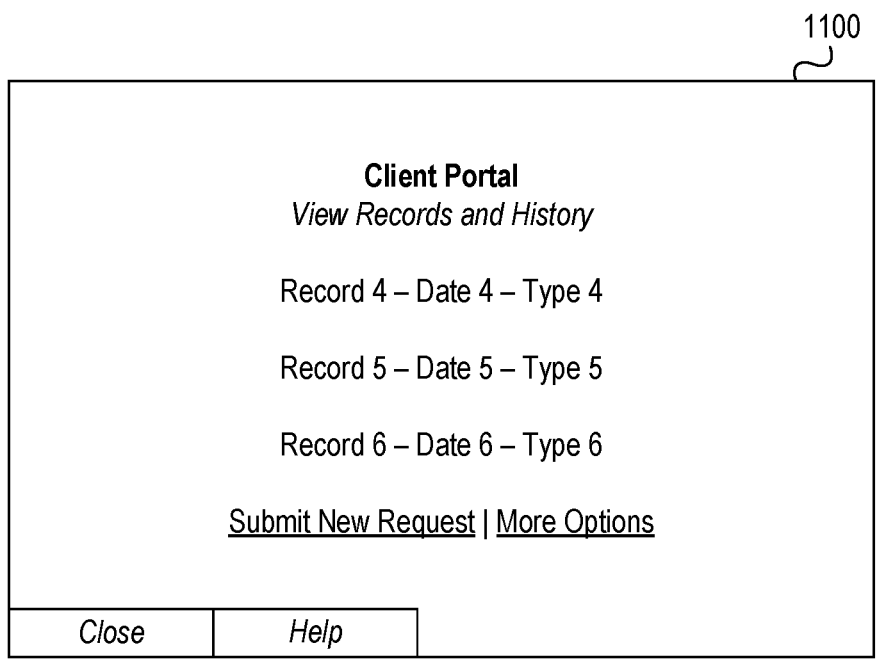

At step 327, client authentication computing platform 110 may send the modified third page to client computing device 160. For example, at step 327, client authentication computing platform 110 may send, via the communication interface (e.g., communication interface 115), to the second client computing device (e.g., client computing device 160), the modified version of the third page associated with the second uniform resource locator. In sending the modified version of the third page associated with the second uniform resource locator to client computing device 160, client authentication computing platform 110 may direct and/or otherwise cause client computing device 160 to display and/or otherwise present the modified version of the third page associated with the second uniform resource locator. For example, in directing and/or otherwise causing client computing device 160 to display and/or otherwise present the modified version of the third page associated with the second uniform resource locator, client authentication computing platform 110 may direct and/or otherwise cause client computing device 160 to display and/or otherwise present a graphical user interface similar to graphical user interface 1100, which is illustrated in FIG. 11. As seen in FIG. 11, graphical user interface 1100 may include text and/or other information associated with the third page associated with the second uniform resource locator. For example, the third page associated with the second uniform resource locator may include a menu allowing a user interacting with graphical user interface 1100 to view user account-specific records and history information, and graphical user interface 1100 may include information identifying user account-specific records and history, such as transaction records, transaction dates, transaction types, and/or other records associated with the user account, and one or more user-selectable links and/or other controls that, when invoked, may enable a user interacting with graphical user interface 1100 to submit a request for a new transaction and/or view one or more other options.

At step 328, client authentication computing platform 110 may receive device data from client computing device 160. For example, at step 328, client authentication computing platform 110 may receive, via the communication interface (e.g., communication interface 115), from the second client computing device (e.g., client computing device 160), device data collected by a third device data collector associated with the third collector code injected into the source code defining the third page associated with the second uniform resource locator. In some instances, in addition to receiving device data from client computing device 160 and/or in response to receiving device data from client computing device 160 (e.g., at step 328), client authentication computing platform 110 also may determine a security state of the second client computing device (e.g., client computing device 160) based on the device data collected by the third device data collector.

Figure 3H:
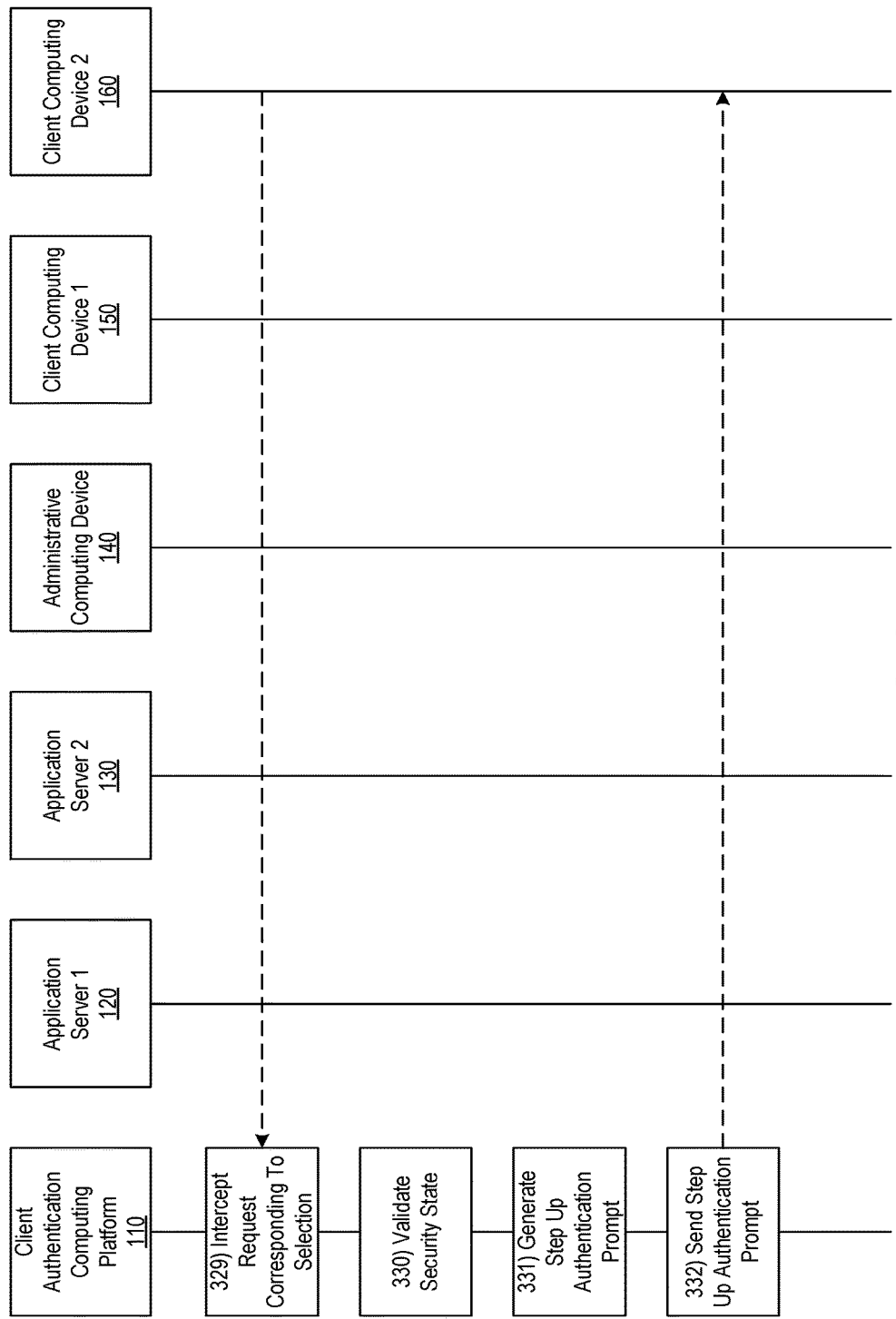

Referring to FIG. 3H, at step 329, client authentication computing platform 110 may intercept a request corresponding to a selection from client computing device 160. For example, at step 329, client authentication computing platform 110 may intercept a request corresponding to a selection of an interface element included in the modified version of the third page associated with the second uniform resource locator. For instance, in intercepting such a request, client authentication computing platform 110 may receive, from client computing device 160, a request corresponding to client computing device 160 and/or a user of client computing device 160 selecting and/or otherwise invoking a specific link, control, menu option, form, or other interface element included in the modified version of the third page sent to client computing device 160 by client authentication computing platform 110. For example, client authentication computing platform 110 may intercept and/or otherwise receive from client computing device 160 a request corresponding to a selection made by the user of client computing device 160 of the link to submit a request for a new transaction included in graphical user interface 1100.

At step 330, client authentication computing platform 110 may validate a security state of client computing device 160. For example, at step 330, based on intercepting the request corresponding to the selection of the interface element included in the modified version of the third page associated with the second uniform resource locator, client authentication computing platform 110 may validate a security state of the second client computing device (e.g., client computing device 160) based on the device data collected by the third device data collector. In validating the security state of the second client computing device (e.g., client computing device 160) based on the device data collected by the third device data collector, client authentication computing platform 110 may, for instance, determine whether and/or attempt to confirm that the second client computing device (e.g., client computing device 160) complies with one or more rules and/or device management policies (which may, e.g., have parameters that are evaluated using the device data collected by the third device data collector). For instance, in validating the security state of the second client computing device (e.g., client computing device 160), client authentication computing platform 110 may, for instance, determine whether and/or attempt to confirm that the second client computing device (e.g., client computing device 160) complies with one or more rules and/or device management policies preventing access to protected links and/or other protected resources from devices that are jailbroken or rooted, have one or more specific blacklisted applications installed and/or running, are connected to one or more specific blacklisted networks, are located in one or more restricted access areas, are located outside of one or more permitted access areas, and/or the like. In addition, in validating the security state of the second client computing device (e.g., client computing device 160), client authentication computing platform 110 may, for instance, evaluate the security state of the second client computing device (e.g., client computing device 160) based on device data received by client authentication computing platform 110 from one or more device data collectors and/or collector results information received by client authentication computing platform 110 from one or more collector support servers (e.g., collector support server 170, collector support server 180).

If client authentication computing platform 110 is able to successfully validate the security state of client computing device 160 at step 330, the event sequence may proceed to step 335. Alternatively, if client authentication computing platform 110 fails to validate the security state of client computing device 160 at step 330, the event sequence may continue as illustrated in FIG. 3H and proceed to step 331 as illustrated and as discussed in greater detail below. In particular, if client authentication computing platform 110 fails to validate the security state of client computing device 160 at step 330, client authentication computing platform 110 may proceed to generate and send a step-up authentication prompt to client computing device 160 to enable access to requested protected content, as discussed in greater detail below.

In some embodiments, validating the security state of the second client computing device based on the device data collected by the third device data collector may include determining the security state of the second client computing device based on the device data collected by the third device data collector. For example, in validating the security state of the second client computing device (e.g., client computing device 160) based on the device data collected by the third device data collector (e.g., at step 330), client authentication computing platform 110 may determine the security state of the second client computing device (e.g., client computing device 160) based on the device data collected by the third device data collector.

In some embodiments, determining the security state of the second client computing device based on the device data collected by the third device data collector may include analyzing the device data collected by the third device data collector. For example, in determining the security state of the second client computing device (e.g., client computing device 160) based on the device data collected by the third device data collector, client authentication computing platform 110 may analyze the device data collected by the third device data collector. Stated differently, in some instances, client authentication computing platform 110 itself may analyze the device data collected by the third device data collector to determine the security state of client computing device 160 (e.g., instead of and/or in addition to sending the device data collected by the third device data collector to one or more other servers or devices for analysis and/or other processing).

In some embodiments, determining the security state of the second client computing device based on the device data collected by the third device data collector may include: sending the device data collected by the third device data collector to a second collector support server associated with the third device data collector; and receiving, from the second collector support server associated with the third device data collector, collector results data identifying the security state of the second client computing device. For example, in determining the security state of the second client computing device (e.g., client computing device 160) based on the device data collected by the third device data collector, client authentication computing platform 110 may send the device data collected by the third device data collector to a second collector support server associated with the third device data collector (e.g., collector support server 180). In addition, client authentication computing platform 110 may receive, from the second collector support server associated with the third device data collector (e.g., collector support server 180), collector results data identifying the security state of the second client computing device (e.g., client computing device 160). Stated differently, in some instances, client authentication computing platform 110 may send the device data collected by the third device data collector to one or more other servers or devices for analysis and/or other processing to determine the security state of client computing device 160 (e.g., instead of client authentication computing platform 110 analyzing the device data collected by the third device data collector itself).

At step 331, client authentication computing platform 110 may generate a step-up authentication prompt for client computing device 160 (e.g., based on failing to validate the security state of client computing device 160). For example, at step 331, in response to failing to validate the security state of the second client computing device (e.g., client computing device 160) based on the device data collected by the third device data collector, client authentication computing platform 110 may generate a second step-up authentication prompt for the second client computing device (e.g., client computing device 160). In addition, the second step-up authentication prompt generated for the second client computing device (e.g., client computing device 160) may be configured to prompt a user of the second client computing device (e.g., client computing device 160) to provide authentication input to access a fourth page associated with the selection of the interface element. The step-up authentication prompt may, for instance, be and/or include a user interface that is generated by client authentication computing platform 110 and sent to client computing device 160 for display to user of client computing device 160. In addition, the step-up authentication prompt may, for instance, prompt and/or otherwise request the user of client computing device 160 to provide one or more specific types of authentication input, such as one-time passcode input, biometric input (e.g., fingerprint biometric input, voice biometric input, facial biometric input, retinal biometric input, and/or other biometric input), security question input, and/or the like.

By generating and/or sending such a step-up authentication prompt to a client device, such as client computing device 160, client authentication computing platform 110 may be able to dynamically allow or enable the client device (e.g., client computing device 160) to access one or more protected resources in instances where the client device (e.g., client computing device 160) does not meet current security requirements and/or policy requirements (e.g., based on the current security state of the client device being out of compliance with one or more security requirements and/or policy requirements). Thus, client authentication computing platform 110 may interrupt a predefined page flow of one or more pages of a client portal to inject a step-up authentication prompt between pages of the client portal (which may, e.g., be generated by one or more applications servers, such as application server 120 and/or application server 130) to step up and/or otherwise increase an authentication status and/or authentication level of the client device (e.g., client computing device 160) so as to subsequently provide the client device (e.g., client computing device 160) with access to one or more protected resources, such as one or more secured pages of the client portal.

In some embodiments, the second step-up authentication prompt generated for the second client computing device may include a one-time passcode authentication prompt. For example, the second step-up authentication prompt generated by client authentication computing platform 110 for the second client computing device (e.g., client computing device 160) may include a one-time passcode authentication prompt that prompts a user of the second client computing device (e.g., client computing device 160) to provide one-time passcode input and/or other authentication input.

In some embodiments, the second step-up authentication prompt generated for the second client computing device may include a biometric authentication prompt. For example, the second step-up authentication prompt generated by client authentication computing platform 110 for the second client computing device (e.g., client computing device 160) may include a biometric authentication prompt that prompts a user of the second client computing device (e.g., client computing device 160) to provide biometric input (e.g., fingerprint biometric input, voice biometric input, facial biometric input, retinal biometric input, and/or other biometric input) and/or other authentication input.

In some embodiments, the second step-up authentication prompt generated for the second client computing device may include a security question authentication prompt. For example, the second step-up authentication prompt generated by client authentication computing platform 110 for the second client computing device (e.g., client computing device 160) may include a security question authentication prompt that prompts a user of the second client computing device (e.g., client computing device 160) to provide security question response input and/or other authentication input.

Figure 12:
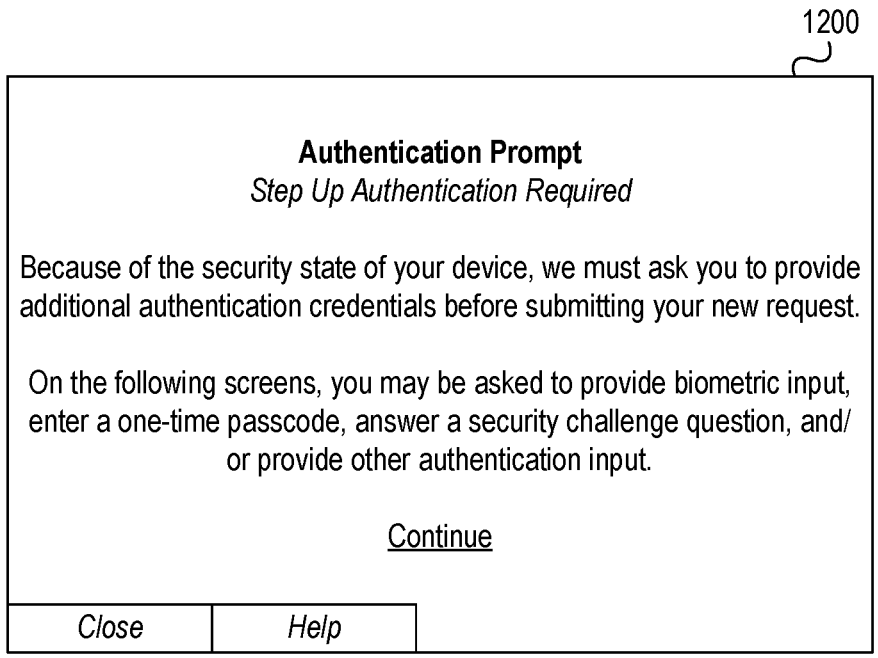

At step 332, client authentication computing platform 110 may send the step-up authentication prompt to client computing device 160. For example, at step 332, client authentication computing platform 110 may send, via the communication interface (e.g., communication interface 115), to the second client computing device (e.g., client computing device 160), the second step-up authentication prompt generated for the second client computing device (e.g., client computing device 160). In sending the second step-up authentication prompt to client computing device 160, client authentication computing platform 110 may direct and/or otherwise cause client computing device 160 to display and/or otherwise present the second step-up authentication prompt. For example, in directing and/or otherwise causing client computing device 160 to display and/or otherwise present the second step-up authentication prompt, client authentication computing platform 110 may direct and/or otherwise cause client computing device 160 to display and/or otherwise present a graphical user interface similar to graphical user interface 1200, which is illustrated in FIG. 12. As seen in FIG. 12, graphical user interface 1200 may include text and/or other information informing the user that step up authentication is required (e.g., "Because of the security state of your device, we must ask you to provide additional authentication credentials before submitting your new request") and/or prompting the user to provide authentication input (e.g., "On the following screens, you may be asked to provide biometric input, enter a one-time passcode, answer a security challenge question, and/or provide other authentication input").

Figure 3I:
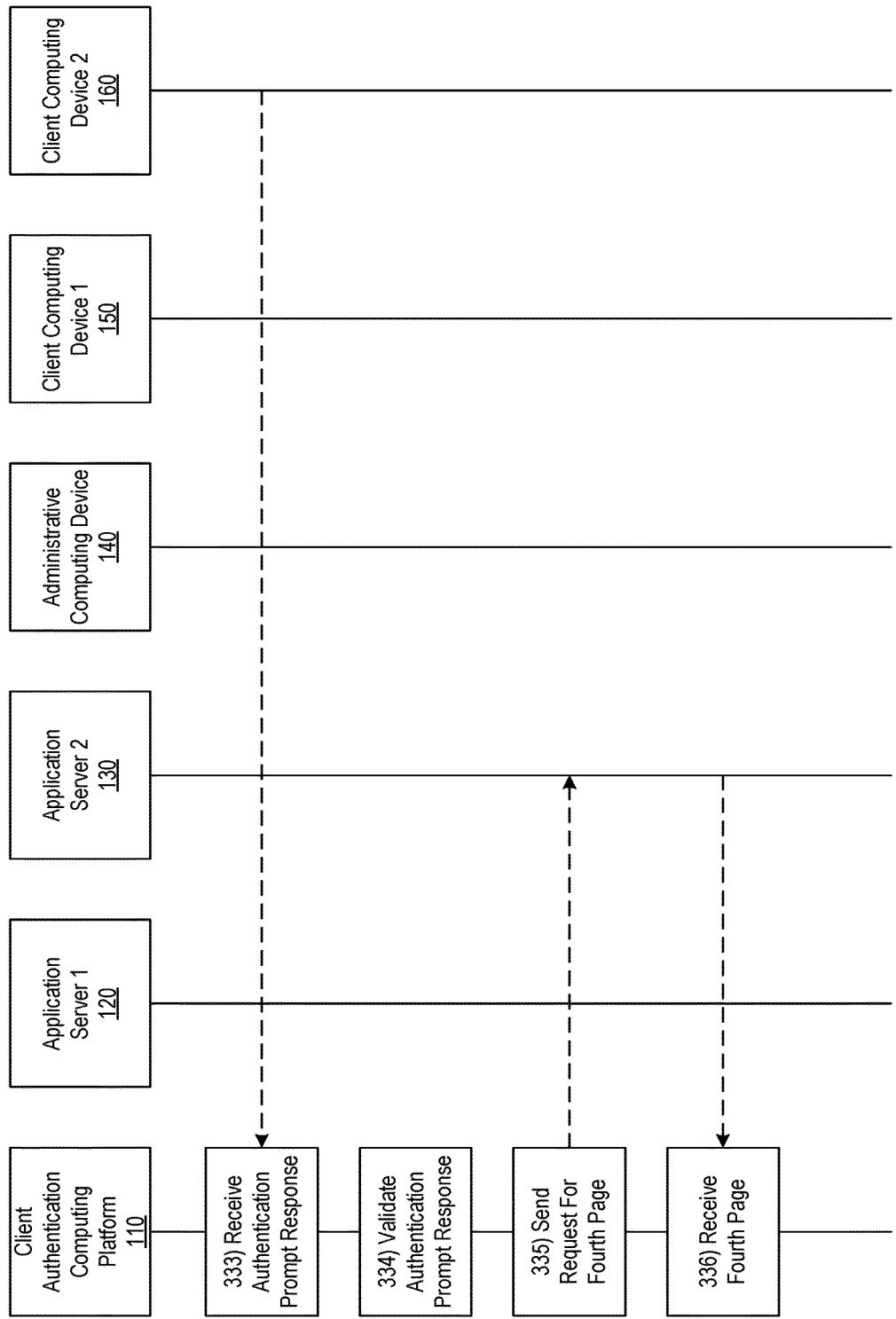

Referring to FIG. 3I, at step 333, client authentication computing platform 110 may receive a response to the authentication prompt from client computing device 160. For example, at step 333, client authentication computing platform 110 may receive, via the communication interface (e.g., communication interface 115), from the second client computing device (e.g., client computing device 160), a response to the second step-up authentication prompt generated for the second client computing device (e.g., client computing device 160). In some instances, the response to the second step-up authentication prompt received from client computing device 160 may include authentication input received by client computing device 160 from the user of client computing device 160 in response to the authentication prompt presented by client computing device 160. Additionally or alternatively, the response to the second step-up authentication prompt received from client computing device 160 may include information indicating that client computing device 160 itself successfully validated authentication input received by client computing device 160 from the user of client computing device 160 in response to the authentication prompt presented by client computing device 160.

At step 334, client authentication computing platform 110 may validate the response to the authentication prompt received from client computing device 160. For example, at step 334, client authentication computing platform 110 may validate the response to the second step-up authentication prompt received from the second client computing device (e.g., client computing device 160). In validating the response to the second step-up authentication prompt received from the second client computing device (e.g., client computing device 160), client authentication computing platform 110 may determine whether and/or confirm that valid authentication input was received by client computing device 160 and/or client authentication computing platform 110 in response to the second step-up authentication prompt generated by client authentication computing platform 110 for the second client computing device (e.g., client computing device 160). For instance, client authentication computing platform 110 may determine whether and/or confirm that valid one-time passcode input, biometric input (e.g., fingerprint biometric input, voice biometric input, facial biometric input, retinal biometric input, and/or other biometric input), security question input, and/or other authentication input was received by the second client computing device (e.g., client computing device 160) and/or by client authentication computing platform 110 in response to the second step-up authentication prompt generated by client authentication computing platform 110 for the second client computing device (e.g., client computing device 160). If client authentication computing platform 110 fails to validate the response to the second step-up authentication prompt received from the second client computing device (e.g., client computing device 160), then client authentication computing platform 110 may generate and/or send one or more error messages and may deny access to client computing device 160 and/or otherwise prevent client computing device 160 from accessing one or more resources corresponding to the selection of the interface element included in the modified version of the third page associated with the second uniform resource locator, and/or client authentication computing platform 110 may deny access to client computing device 160 and/or otherwise prevent client computing device 160 from accessing one or more other protected resources. If client authentication computing platform 110 successfully validates the response to the second step-up authentication prompt received from the second client computing device (e.g., client computing device 160), then the example event sequence may continue as illustrated in FIG. 3I.

At step 335, client authentication computing platform 110 may send a request for a fourth page to application server 130. For example, at step 335, based on validating the response to the second step-up authentication prompt, client authentication computing platform 110 may send, via the communication interface (e.g., communication interface 115), to a second application server (e.g., application server 130), a request for the fourth page associated with the selection of the interface element. At step 336, client authentication computing platform 110 may receive the fourth page (e.g., header data, content data, and/or other data defining and/or otherwise associated with the fourth page) from application server 130. For example, at step 336, client authentication computing platform 110 may receive, via the communication interface (e.g., communication interface 115), from the second application server (e.g., application server 130), the fourth page associated with the selection of the interface element.

Figure 3J:
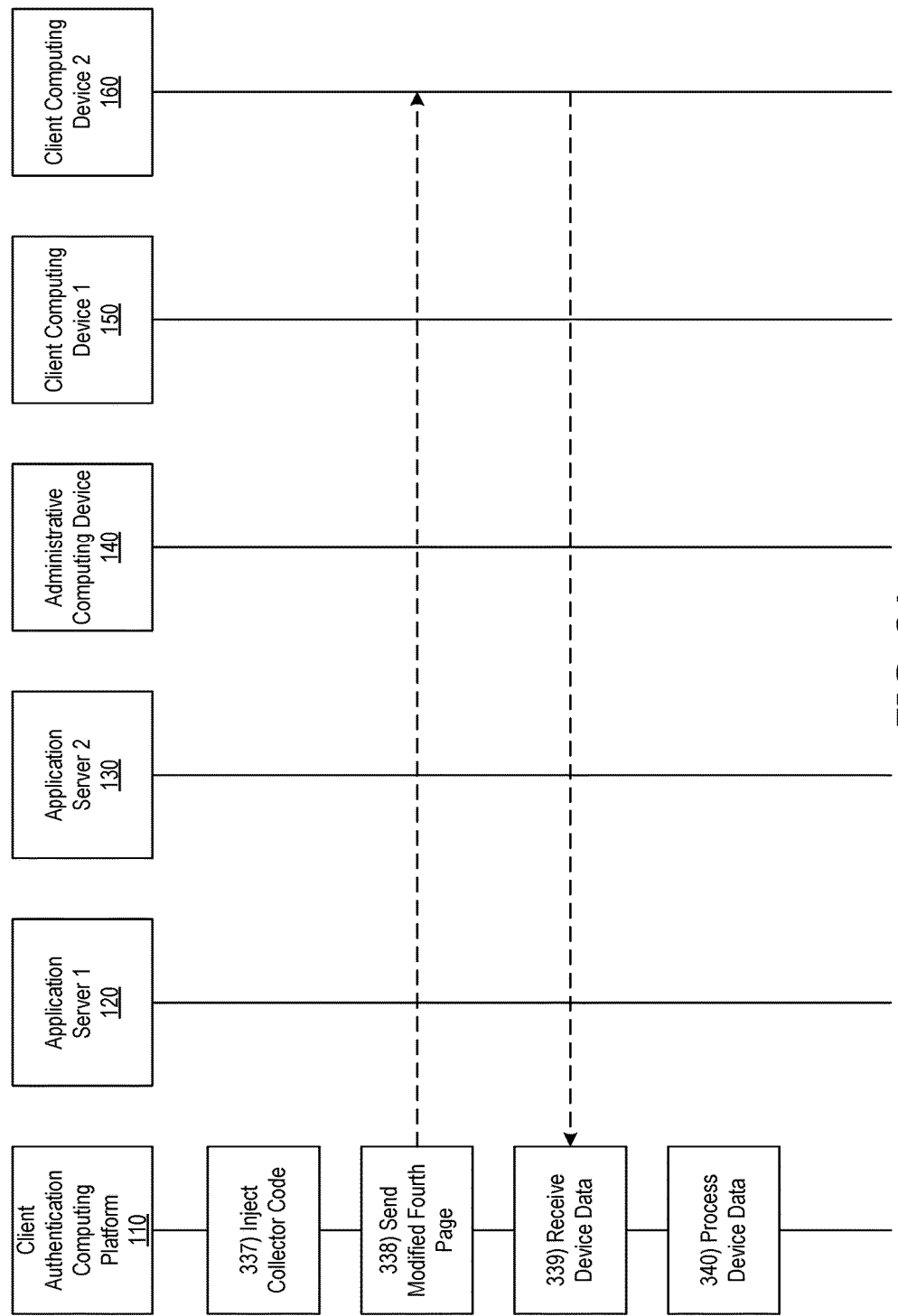

Referring to FIG. 3J, at step 337, client authentication computing platform 110 may inject collector code into the fourth page. For example, at step 337, client authentication computing platform 110 may generate a modified version of the fourth page associated with the selection of the interface element by injecting fourth collector code into source code defining the fourth page associated with the selection of the interface element. In some instances, the fourth collector code may correspond to the same device data collector as the third collector code injected into the third page, while in other instances, the fourth collector code may correspond to a different device data collector (which may, e.g., collect and/or evaluate different attributes) than the third collector code injected into the third page.

Figure 13:
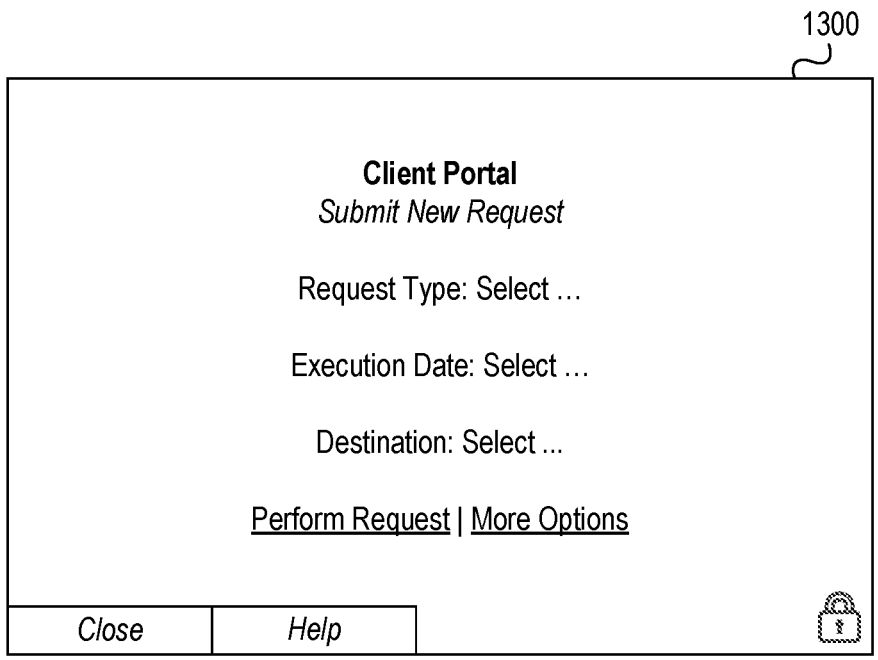

At step 338, client authentication computing platform 110 may send the modified fourth page to client computing device 160. For example, at step 338, client authentication computing platform 110 may send, via the communication interface (e.g., communication interface 115), to the second client computing device (e.g., client computing device 160), the modified version of the fourth page associated with the selection of the interface element. In sending the modified version of the fourth page associated with the selection of the interface element to client computing device 160, client authentication computing platform 110 may direct and/or otherwise cause client computing device 160 to display and/or otherwise present the modified version of the fourth page associated with the selection of the interface element. For example, in directing and/or otherwise causing client computing device 160 to display and/or otherwise present the modified version of the fourth page associated with the selection of the interface element, client authentication computing platform 110 may direct and/or otherwise cause client computing device 160 to display and/or otherwise present a graphical user interface similar to graphical user interface 1300, which is illustrated in FIG. 13. As seen in FIG. 13, graphical user interface 1300 may include text and/or other information of the fourth page associated with the selection of the interface element. For example, the fourth page associated with the selection of the interface element may include a menu allowing a user interacting with graphical user interface 1300 to submit a request for a new transaction, and graphical user interface 1300 may include one or more fields and/or controls that, when invoked and/or modified, may enable a user interacting with graphical user interface 1300 to specify, identify and/or otherwise input one or more parameters of a request for a new transaction, such as a request type parameter, an execution date parameter, a destination parameter, and/or other information associated with the request for the new transaction.

At step 339, client authentication computing platform 110 may receive device data from client computing device 160. For example, at step 339, client authentication computing platform 110 may receive, via the communication interface (e.g., communication interface 115), from the second client computing device (e.g., client computing device 160), device data collected by a fourth device data collector associated with the fourth collector code injected into the source code defining the fourth page associated with the selection of the interface element. The device data collected by the fourth device data collector may, for instance, be received from a browser or other application that is viewing, presenting, and/or executing the source code defining the fourth page associated with the selection of the interface element (which may, e.g., include the injected fourth collector code corresponding to the fourth device data collector).

At step 340, client authentication computing platform 110 may process the device data received from client computing device 160. For example, at step 340, client authentication computing platform 110 may re-validate the security state of client computing device 160 and/or otherwise process the device data received from client computing device 160. In addition, client authentication computing platform 110 may continue to selectively allow and/or prevent access to specific functions, pages, and/or other resources of a client portal based on the security state of client computing device 160 and/or the device data received from client computing device 160.

Figure 14:
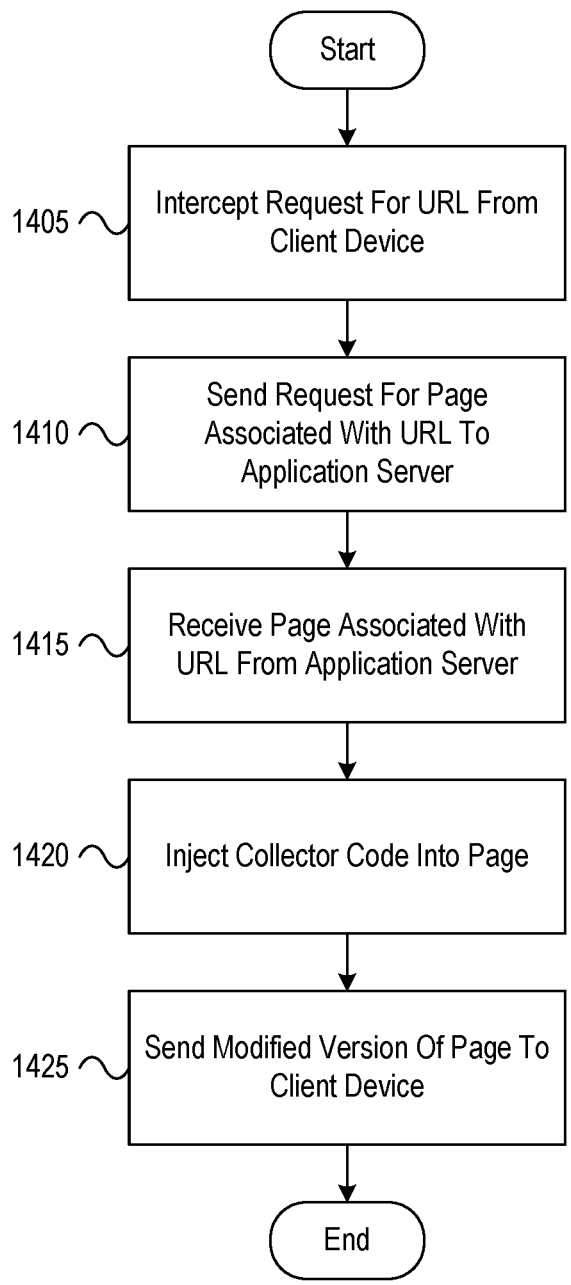
FIG. 14 depicts an illustrative method for preventing unauthorized access to secured information systems by injecting device data collectors in accordance with one or more example embodiments.

FIG. 14 depicts an illustrative method for preventing unauthorized access to secured information systems by injecting device data collectors in accordance with one or more example embodiments. Referring to FIG. 14, at step 1405, a computing platform having at least one processor, a memory, and a communication interface may intercept a request for a first uniform resource locator from a first client computing device based on configuration information identifying the first uniform resource locator as being protected. At step 1410, based on intercepting the request for the first uniform resource locator, the computing platform may send, via the communication interface, to a first application server, a request for a first page associated with the first uniform resource locator. At step 1415, the computing platform may receive, via the communication interface, from the first application server, the first page associated with the first uniform resource locator. At step 1420, the computing platform may generate a modified version of the first page associated with the first uniform resource locator by injecting first collector code into source code defining the first page associated with the first uniform resource locator. At step 1425, the computing platform may send, via the communication interface, to the first client computing device, the modified version of the first page associated with the first uniform resource locator.

Figure 15:
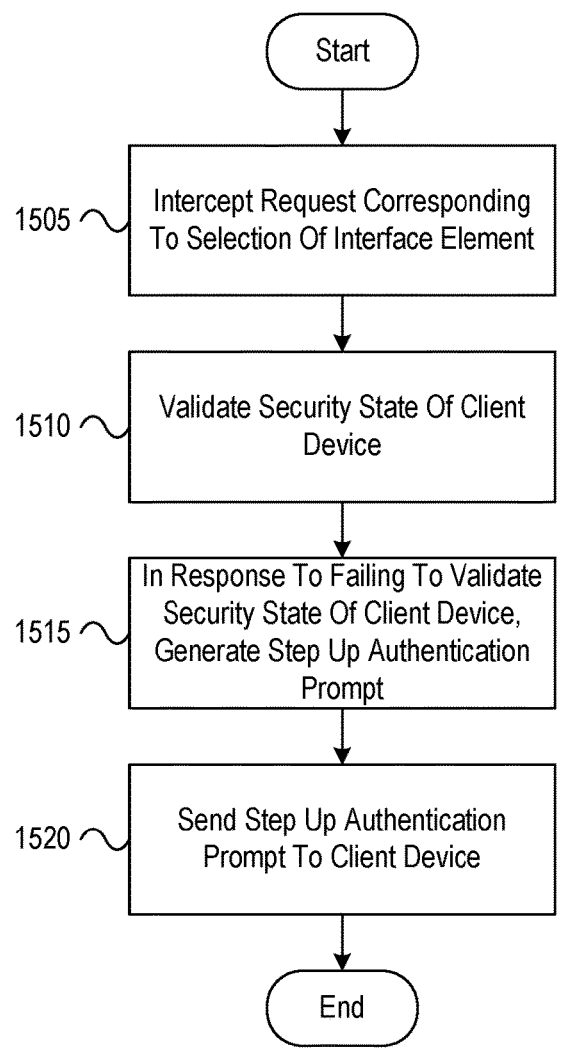
FIG. 15 depicts another illustrative method for preventing unauthorized access to secured information systems by injecting device data collectors in accordance with one or more example embodiments.

FIG. 15 depicts another illustrative method for preventing unauthorized access to secured information systems by injecting device data collectors in accordance with one or more example embodiments. Referring to FIG. 15, at step 1505, a computing platform having at least one processor, a memory, and a communication interface may intercept a request corresponding to a selection of an interface element included in a modified version of a first page associated with a first uniform resource locator. At step 1510, based on intercepting the request corresponding to the selection of the interface element included in the modified version of the first page associated with the first uniform resource locator, the computing platform may validate a security state of a first client computing device based on device data collected by a first device data collector. At step 1515, in response to failing to validate the security state of the first client computing device based on the device data collected by the first device data collector, the computing platform may generate a first step-up authentication prompt for the first client computing device. At step 1520, the computing platform may send, via the communication interface, to the first client computing device, the first step-up authentication prompt generated for the first client computing device. The first step-up authentication prompt generated for the first client computing device may be configured to prompt a user of the first client computing device to provide authentication input to access a second page associated with the selection of the interface element.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   intercept a request for a first uniform resource locator from a first client computing device based on configuration information identifying the first uniform resource locator as being protected;
   based on intercepting the request for the first uniform resource locator, send, via the communication interface, to a first application server, a request for a first page associated with the first uniform resource locator;
   receive, via the communication interface, from the first application server, the first page associated with the first uniform resource locator;
   generate a modified version of the first page associated with the first uniform resource locator by injecting first collector code into source code defining the first page associated with the first uniform resource locator, wherein injecting the first collector code into the source code defining the first page associated with the first uniform resource locator comprises:
   loading the first collector code from a library of collector code that maintains code defining a plurality of different device data collectors; and
   inserting the first collector code loaded from the library of collector code into the source code defining the first page associated with the first uniform resource locator,
   wherein the first collector code defines a first device data collector that is configured to collect device state information from the first client computing device when the modified version of the first page associated with the first uniform resource locator is executed by the first client computing device; and
   send, via the communication interface, to the first client computing device, the modified version of the first page associated with the first uniform resource locator.

2. The computing platform of claim 1, wherein the memory stores additional computer-readable instructions that, when executed by the at least one processor, cause the computing platform to:
   receive, via the communication interface, from the first client computing device, device data collected by the first device data collector associated with the first collector code injected into the source code defining the first page associated with the first uniform resource locator.

3. The computing platform of claim 2, wherein the memory stores additional computer-readable instructions that, when executed by the at least one processor, cause the computing platform to:
   determine a security state of the first client computing device based on the device data collected by the first device data collector.

4. The computing platform of claim 3, wherein determining the security state of the first client computing device based on the device data collected by the first device data collector comprises analyzing the device data collected by the first device data collector.

5. The computing platform of claim 3, wherein determining the security state of the first client computing device based on the device data collected by the first device data collector comprises:
   sending the device data collected by the first device data collector to a first collector support server associated with the first device data collector; and
   receiving, from the first collector support server associated with the first device data collector, collector results data identifying the security state of the first client computing device.

6. The computing platform of claim 1, wherein the first device data collector defined by the first collector code is configured to collect information indicating whether the first client computing device is jailbroken or rooted when the modified version of the first page associated with the first uniform resource locator is executed by the first client computing device.

7. The computing platform of claim 1, wherein the first device data collector defined by the first collector code is configured to collect information indicating what applications are installed or running on the first client computing device when the modified version of the first page associated with the first uniform resource locator is executed by the first client computing device.

8. The computing platform of claim 2, wherein the memory stores additional computer-readable instructions that, when executed by the at least one processor, cause the computing platform to:

intercept a request corresponding to a selection of an interface element included in the modified version of the first page associated with the first uniform resource locator;

based on intercepting the request corresponding to the selection of the interface element included in the modified version of the first page associated with the first uniform resource locator, validate a security state of the first client computing device based on the device data collected by the first device data collector;

based on validating the security state of the first client computing device, send, via the communication interface, to the first application server, a request for a second page associated with the selection of the interface element;

receive, via the communication interface, from the first application server, the second page associated with the selection of the interface element;

generate a modified version of the second page associated with the selection of the interface element by injecting second collector code into source code defining the second page associated with the selection of the interface element; and send, via the communication interface, to the first client computing device, the modified version of the second page associated with the selection of the interface element.

9. The computing platform of claim 8, wherein the memory stores additional computer-readable instructions that, when executed by the at least one processor, cause the computing platform to:

receive, via the communication interface, from the first client computing device, device data collected by a second device data collector associated with the second collector code injected into the source code defining the second page associated with the selection of the interface element.

10. The computing platform of claim 9, wherein the second device data collector associated with the second collector code injected into the source code defining the second page associated with the selection of the interface element is different from the first device data collector associated with the first collector code injected into the source code defining the first page associated with the first uniform resource locator.

11. The computing platform of claim 9, wherein the memory stores additional computer-readable instructions that, when executed by the at least one processor, cause the computing platform to:

intercept a request for a second uniform resource locator from a second client computing device based on configuration information identifying the second uniform resource locator as being protected;

based on intercepting the request for the second uniform resource locator, send, via the communication interface, to a second application server, a request for a third page associated with the second uniform resource locator;

receive, via the communication interface, from the second application server, the third page associated with the second uniform resource locator;

generate a modified version of the third page associated with the second uniform resource locator by injecting third collector code into source code defining the third page associated with the second uniform resource locator; and send, via the communication interface, to the second client computing device, the modified version of the third page associated with the second uniform resource locator.

12. The computing platform of claim 11, wherein the memory stores additional computer-readable instructions that, when executed by the at least one processor, cause the computing platform to:

receive, via the communication interface, from the second client computing device, device data collected by a third device data collector associated with the third collector code injected into the source code defining the third page associated with the second uniform resource locator.

13. The computing platform of claim 12, wherein the memory stores additional computer-readable instructions that, when executed by the at least one processor, cause the computing platform to:

determine a security state of the second client computing device based on the device data collected by the third device data collector.

14. The computing platform of claim 13, wherein determining the security state of the second client computing device based on the device data collected by the third device data collector comprises analyzing the device data collected by the third device data collector.

15. The computing platform of claim 13, wherein determining the security state of the second client computing device based on the device data collected by the third device data collector comprises:

sending the device data collected by the third device data collector to a second collector support server associated with the third device data collector; and receiving, from the second collector support server associated with the third device data collector, collector results data identifying the security state of the second client computing device.

16. The computing platform of claim 12, wherein the memory stores additional computer-readable instructions that, when executed by the at least one processor, cause the computing platform to:

intercept a request corresponding to a selection of an interface element included in the modified version of the third page associated with the second uniform resource locator;

based on intercepting the request corresponding to the selection of the interface element included in the modified version of the third page associated with the second uniform resource locator, validate a security state of the second client computing device based on the device data collected by the third device data collector;

based on validating the security state of the second client computing device, send, via the communication interface, to the second application server, a request for a fourth page associated with the selection of the interface element;

receive, via the communication interface, from the second application server, the fourth page associated with the selection of the interface element;

generate a modified version of the fourth page associated with the selection of the interface element by injecting fourth collector code into source code defining the fourth page associated with the selection of the interface element; and send, via the communication interface, to the second client computing device, the modified version of the fourth page associated with the selection of the interface element.

17. The computing platform of claim 16, wherein the memory stores additional computer-readable instructions that, when executed by the at least one processor, cause the computing platform to:
receive, via the communication interface, from the second client computing device, device data collected by a fourth device data collector associated with the fourth collector code injected into the source code defining the fourth page associated with the selection of the interface element.

18. The computing platform of claim 17, wherein the fourth device data collector associated with the fourth collector code injected into the source code defining the fourth page associated with the selection of the interface element is different from the third device data collector associated with the third collector code injected into the source code defining the third page associated with the second uniform resource locator.

19. A method, comprising:
at a computing platform comprising at least one processor, memory, and a communication interface:
intercepting, by the at least one processor, a request for a first uniform resource locator from a first client computing device based on configuration information identifying the first uniform resource locator as being protected;
based on intercepting the request for the first uniform resource locator, sending, by the at least one processor, via the communication interface, to a first application server, a request for a first page associated with the first uniform resource locator;
receiving, by the at least one processor, via the communication interface, from the first application server, the first page associated with the first uniform resource locator;
generating, by the at least one processor, a modified version of the first page associated with the first uniform resource locator by injecting first collector code into source code defining the first page associated with the first uniform resource locator wherein injecting the first collector code into the source code defining the first page associated with the first uniform resource locator comprises:
loading the first collector code from a library of collector code that maintains code defining a plurality of different device data collectors; and
inserting the first collector code loaded from the library of collector code into the source code defining the first page associated with the first uniform resource locator,
wherein the first collector code defines a first device data collector that is configured to collect device state information from the first client computing device when the modified version of the first page associated with the first uniform resource locator is executed by the first client computing device; and
sending, by the at least one processor, via the communication interface, to the first client computing device, the modified version of the first page associated with the first uniform resource locator.

20. One or more non-transitory computer-readable media storing instructions that, when executed by a computing platform comprising at least one processor, memory, and a communication interface, cause the computing platform to:
intercept a request for a first uniform resource locator from a first client computing device based on configuration information identifying the first uniform resource locator as being protected;
based on intercepting the request for the first uniform resource locator, send, via the communication interface, to a first application server, a request for a first page associated with the first uniform resource locator;
receive, via the communication interface, from the first application server, the first page associated with the first uniform resource locator;
generate a modified version of the first page associated with the first uniform resource locator by injecting first collector code into source code defining the first page associated with the first uniform resource locator, wherein injecting the first collector code into the source code defining the first page associated with the first uniform resource locator comprises:
loading the first collector code from a library of collector code that maintains code defining a plurality of different device data collectors; and
inserting the first collector code loaded from the library of collector code into the source code defining the first page associated with the first uniform resource locator,
wherein the first collector code defines a first device data collector that is configured to collect device state information from the first client computing device when the modified version of the first page associated with the first uniform resource locator is executed by the first client computing device; and
send, via the communication interface, to the first client computing device, the modified version of the first page associated with the first uniform resource locator.

* * * * *

UNITED STATES PATENT AND TRADEMARK OFFICE
CERTIFICATE OF CORRECTION

PATENT NO. : 10,412,093 B2
APPLICATION NO. : 15/252505
DATED : September 10, 2019
INVENTOR(S) : Xianhong Zhang Page 1 of 1

It is certified that error appears in the above-identified patent and that said Letters Patent is hereby corrected as shown below:

In the Claims

Column 49, Line 44:
In Claim 19, after "locator", insert --,--

Signed and Sealed this
Seventeenth Day of November, 2020

Andrei Iancu
*Director of the United States Patent and Trademark Office*